(12) United States Patent
Ono

(10) Patent No.: US 8,609,291 B2
(45) Date of Patent: Dec. 17, 2013

(54) FUEL CELL MODULE INCLUDING HEATING INSULATOR WITH OPENING

(75) Inventor: Takashi Ono, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 891 days.

(21) Appl. No.: 12/693,332

(22) Filed: Jan. 25, 2010

(65) Prior Publication Data

US 2010/0119906 A1    May 13, 2010

Related U.S. Application Data

(63) Continuation-in-part of application No. PCT/JP2008/055981, filed on Mar. 27, 2008.

(30) Foreign Application Priority Data

Jul. 27, 2007  (JP) .................................. 2007-195915
Jan. 29, 2008  (JP) .................................. 2008-017241

(51) Int. Cl.
*H01M 8/04*  (2006.01)
*H01M 8/24*  (2006.01)

(52) U.S. Cl.
CPC ........ *H01M 8/04007* (2013.01); *H01M 8/2475* (2013.01)
USPC ............................ 429/434; 429/452; 429/433

(58) Field of Classification Search
USPC ................................................ 429/433–452
See application file for complete search history.

(56) References Cited

U.S. PATENT DOCUMENTS

| 4,910,100 A | * | 3/1990 | Nakanishi et al. ............ 429/423 |
| 5,330,858 A | * | 7/1994 | Shundou et al. ............. 429/436 |
| 2003/0091888 A1 | * | 5/2003 | Goggin ........................... 429/38 |
| 2004/0191593 A1 | * | 9/2004 | Ono et al. ........................ 429/19 |
| 2006/0040153 A1 | | 2/2006 | Tokoi et al. |
| 2006/0240302 A1 | * | 10/2006 | Senner et al. .................. 429/32 |
| 2009/0130533 A1 | | 5/2009 | Hirata et al. |
| 2009/0239121 A1 | | 9/2009 | Ono |

FOREIGN PATENT DOCUMENTS

| EP | 1909349 | 4/2008 | |
| JP | 7282833 | 10/1995 | |
| JP | H7-282833 A | 10/1995 | |
| JP | 2005317292 A | * 11/2005 | ............. H01M 8/12 |
| JP | 2006331881 | 12/2006 | |
| JP | 2006331881 A | * 12/2006 | ............. H01M 8/06 |
| JP | 2007026744 | 2/2007 | |
| JP | 2007103237 | 4/2007 | |
| JP | 2007103237 A | 4/2007 | |
| WO | 2007/013328 A1 | 2/2007 | |
| WO | 2007066619 | 6/2007 | |
| WO | 2008/041593 A1 | 4/2008 | |
| WO | 2008041593 | 4/2008 | |

OTHER PUBLICATIONS

Machine translation for Ono et al., JP 2006-331881 A.*
Adiathermic. (n.d.). Webster's Revised Unabridged Dictionary. Retrieved May 14, 2013, from Dictionary.com website: http://dictionary.reference.com/browse/adiathermic.*
PCT/JP2008/055981, PCT/ISA/210—international search report.

* cited by examiner

*Primary Examiner* — Edu E Enin-Okut
(74) *Attorney, Agent, or Firm* — Procopio, Cory, Hargreaves & Savitch LLP

(57) ABSTRACT

A fuel cell configuration operable to provide a more uniform heat distribution within the fuel cell configuration is disclosed. A reactant gas, liquid or suspended solid (slurry) is circulated through the fuel cell configuration in such a manner that inherently hotter portions of the fuel cell are cooled. The more uniform heat distribution can enhance fuel cell life and operating characteristics.

12 Claims, 13 Drawing Sheets

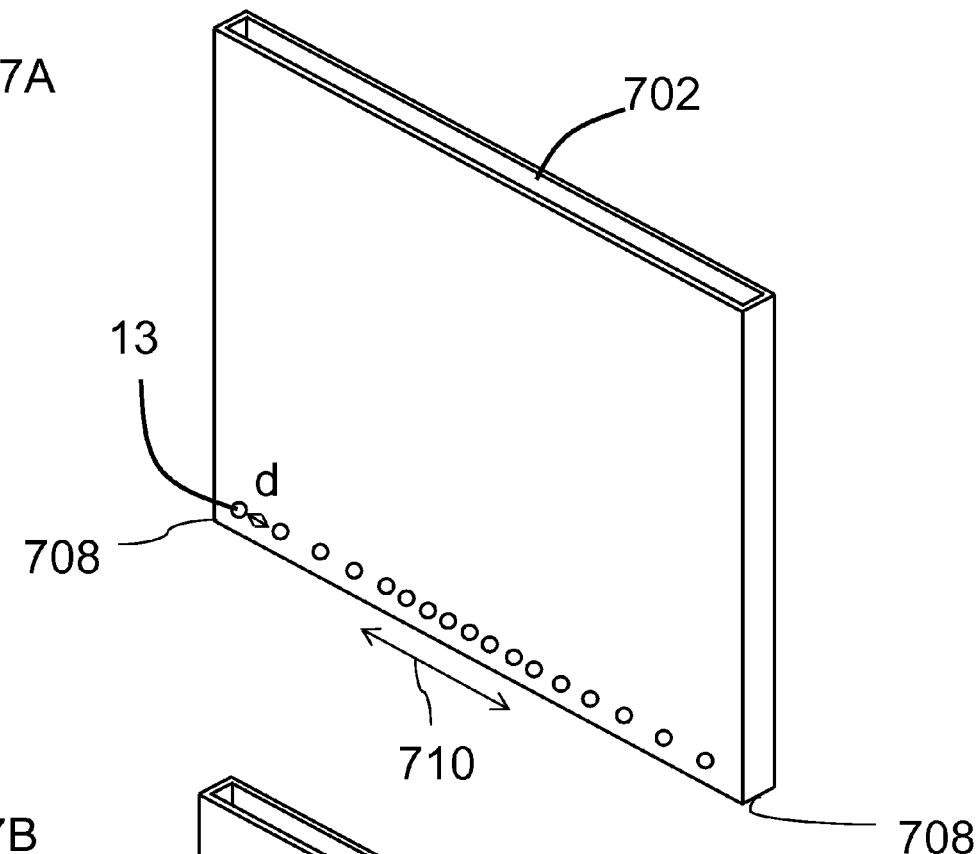
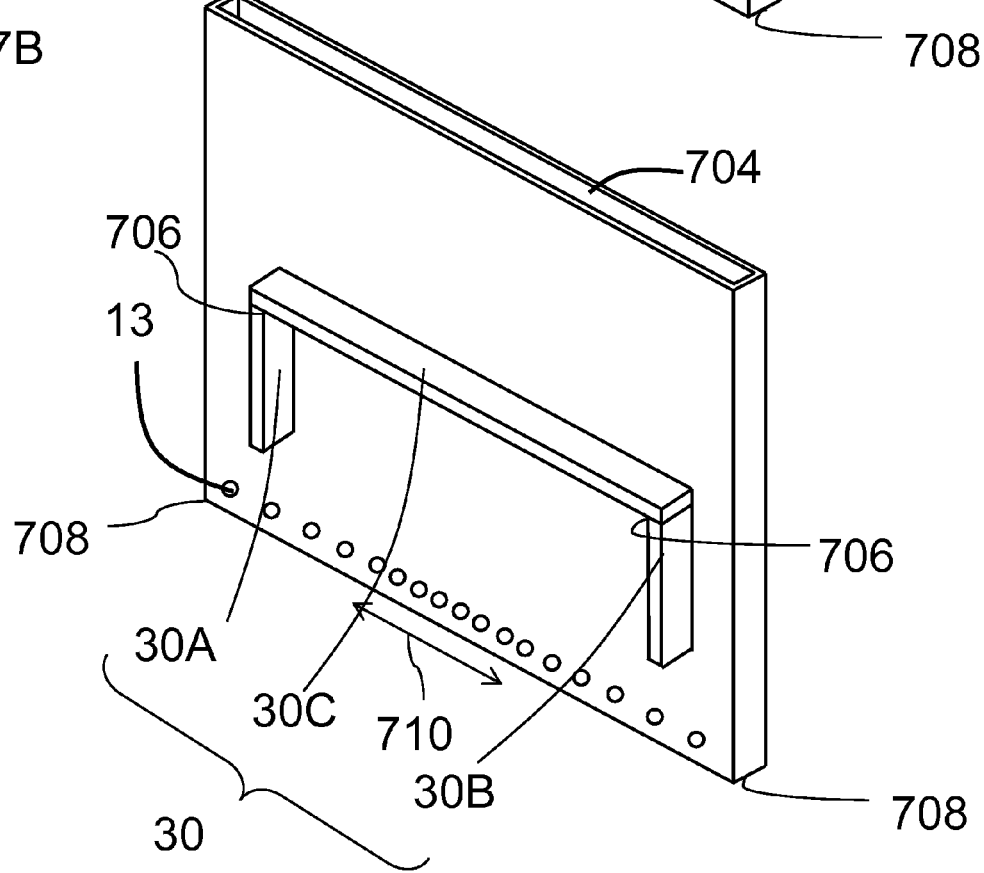

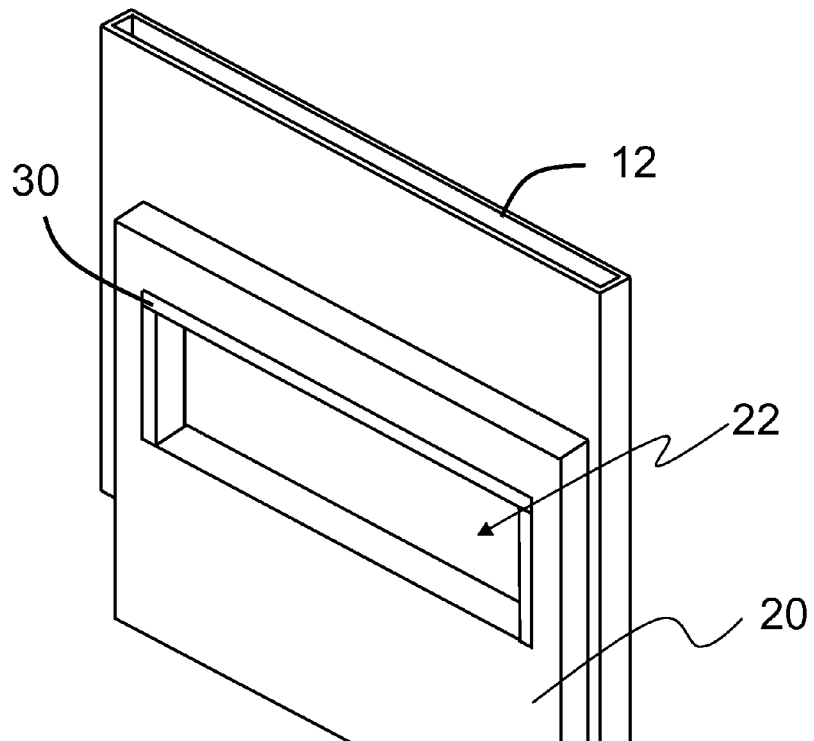
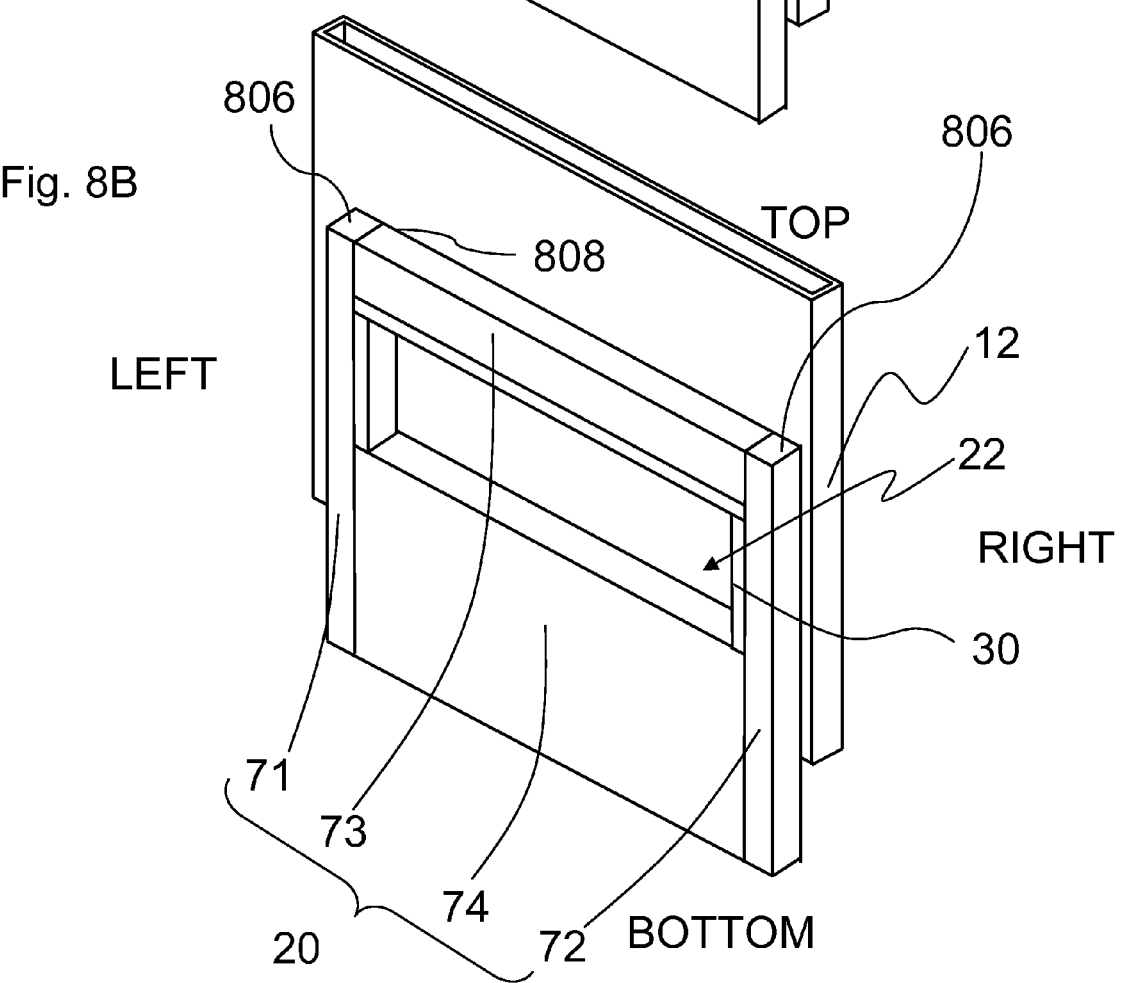

FUEL CELL MODULE INCLUDING HEATING INSULATOR WITH OPENING

CROSS-REFERENCE TO RELATED APPLICATIONS

The present application is a continuation in part based on PCT application No. JP2008/055981, filed on Mar. 27, 2008, which claims priority to Japanese patent application no. 2007-195915, filed on Jul. 27, 2007, and Japanese patent application no. 2008-017241, filed on Jan. 29, 2008, the contents of which are incorporated by reference herein in their entirety.

FIELD OF THE INVENTION

Embodiments of the present disclosure relate generally to fuel cell modules, and more particularly relate to fuel cell modules comprising a plurality of fuel cells.

BACKGROUND

One of the next-generation candidates for electric power generation is a fuel cell. A fuel cell generates electric power by direct electrical power generation from a fuel and oxidizer in a manner similar to a battery. A fuel cell generally uses hydrogen and/or carbon based fuels, e.g., natural gas, hydrogen, methanol, coal (i.e., for a direct carbon fuel cell). The fuel is generally in a liquid (e.g., a direct methanol fuel cell) or gaseous form, although solid fuel (e.g., a slurred mixture of coal) has been used in some experimental fuel cells.

Fuel cells are used in fuel cell modules and fuel cell apparatuses comprising fuel cell modules. One example of a fuel cell module comprises a fuel cell stack housed in a rectangular parallelepiped housing. A fuel cell stack generally comprises a plurality of fuel cells that are juxtaposed to each other, electrically coupled in series, and attached to a manifold. Some fuel cell modules comprise a plurality of fuel cell stacks in a housing. In such fuel cell modules, a heat insulator may be positioned between fuel cell stacks.

When generating electricity with a fuel cell module or fuel cell apparatus, a fuel cell stack generates heat. Heat resulting from the generation of electricity is dissipated from between adjacent fuel cells. Although fuel cells positioned at the ends of a fuel cell stack in the direction in which the fuel cells are arrayed (array direction) can more easily dissipate heat, fuel cells positioned around the central portion cannot easily dissipate heat.

Accordingly, there is a need for fuel cell modules in which a temperature distribution of a cell stack is closer to uniform.

SUMMARY

A fuel cell configuration operable to provide a more uniform heat distribution within the fuel cell configuration is disclosed. A reactant gas, liquid or suspended solid (slurry) is circulated through the fuel cell configuration in such a manner that inherently hotter portions of the fuel cell are cooled. The more uniform heat distribution can enhance fuel cell life and operating characteristics.

A first embodiment comprises a fuel cell module. The fuel cell module comprises a cell stack comprising a plurality of fuel cells arrayed adjacent to one another and having a cell stack length, a heat insulator, and a housing for housing the cell stack and the heat insulator. The heat insulator comprises a first portion and a second portion. The first portion faces an upper portion of a first side surface of the cell stack and has a length approximately equal to or longer than the cell stack length. The second portion is separated from the first portion and faces a lower portion of the side surface of the cell stack and has a length approximately equal to or longer than the cell stack length.

A second embodiment comprises a fuel cell module. The fuel cell module comprises a cell stack comprising a plurality of fuel cells arrayed adjacent to one another, a heat insulator, and a housing for housing the cell stack and the heat insulator. The heat insulator is positioned to face a side surface of the cell stack and cover upper and lower portions of the side surface so as to provide a space for an inflow and circulation of a reactant gas from between the fuel cells.

A third embodiment comprises a fuel cell apparatus. The fuel cell apparatus comprises fuel cell means operable to provide a uniform heat distribution within a fuel cell configuration, and a case for housing the fuel cell means.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 7A is an illustration of a schematic perspective view of a reactant gas inlet according to an embodiment of the disclosure.

FIG. 7B is an illustration of a schematic perspective view of an exemplary reactant gas inlet according to an embodiment of the disclosure.

FIG. 8A is an illustration of an exemplary state in which a heat insulator is coupled to a coupling member according to an embodiment of the disclosure.

FIG. 8B is an illustration of an exemplary state in which a heat insulator is coupled to a coupling member according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, a hydrogen gas based fuel cell. Embodiments of the disclosure, however, are not limited to such hydrogen gas based fuel cell, and the techniques described herein may also be utilized in other applications. For example, embodiments may be applicable to liquid-fuel fuel cells, direct methanol fuel cells, direct ethanol fuel cells, direct carbon fuel cells, solid-fuel-in-suspended-liquid fuel cells, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
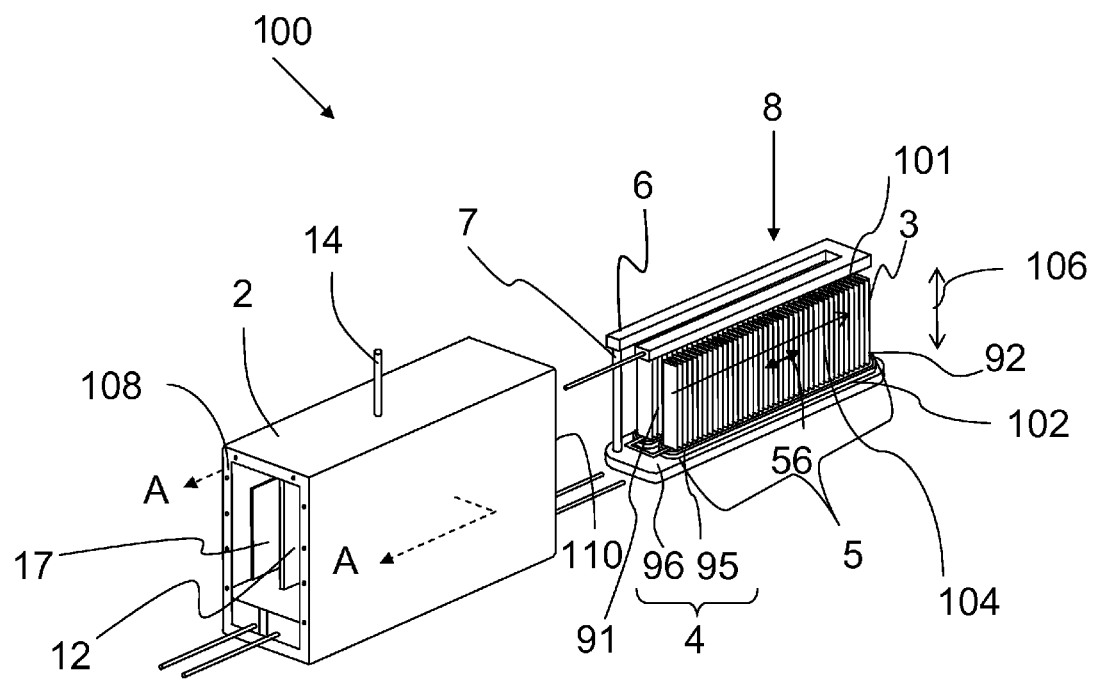
FIG. 1 is an illustration of a schematic perspective view of an exemplary fuel cell module according to an embodiment of the disclosure.

FIG. 1 is an illustration of a schematic perspective view of an exemplary fuel cell module 100 (module 100) according to an embodiment of the disclosure. The module 100 comprises a rectangular parallelepiped housing 2 and a cell stack assembly 8 housed in the housing 2. The cell stack assembly 8 comprises a manifold 4, two cell stacks 5 juxtaposed to each other, a reformer 6, and a gas flow pipe 7.

The manifold 4 comprises a base 96 and a joint 95 disposed on the base 96. The base 96 has a plate shape and the joint 95 has a frame shape.

Each of the cell stacks 5 comprises a plurality of fuel cells 3 and a current collector (not shown). The each of the fuel cells 3 comprises a gas passage (not shown) through which a fuel gas flows. Each of the fuel cells 3 are arrayed adjacent to one another on the manifold 4. The fuel cells 3 are arranged in an upright position and are electrically coupled in series via a current collector (not shown). The fuel cells 3 are each attached at their lower end 102 to the manifold 4 with an insulating binder (not shown), such as a glass sealant. Specifically, the fuel cells 3 are disposed on the base 96 so as to be surrounded by the joint 95 and the space between the fuel cells 3 and the joint 95 are filled with the insulating binder, thereby the fuel cells 3 are attached to the manifold 4.

The fuel cells 3 are hollow plates comprising a gas passage (not shown) through which a fuel gas flows. The fuel cells 3 may be, for example but without limitation, solid oxide fuel cells each comprising a fuel-side electrode, a solid electrolyte, an oxygen-side electrode on a supporting substrate, and the like. The fuel-side electrode, the solid electrolyte and the oxygen-side electrode each comprise an electricity generation portion.

The reformer 6 is positioned above the cell stacks 5. The reformer 6 reforms a fuel, such as natural gas or kerosene, to produce a hydrogen-containing gas (fuel gas) used in the fuel cells 3.

The fuel gas produced in the reformer 6 is supplied to the manifold 4 through the gas flow pipe 7. The fuel gas in the manifold 4 is supplied to the gas passage (not shown) in the fuel cells 3.

In the embodiment shown in FIG. 1, a front face at a front side 108 and a back face at a back side 110 of the housing 2 are removed, and the cell stack assembly 8 is pulled out backward from the back of the housing 2. In the module 100 illustrated in FIG. 1, the cell stack assembly 8 can be slid into the housing 2.

Figure 2:
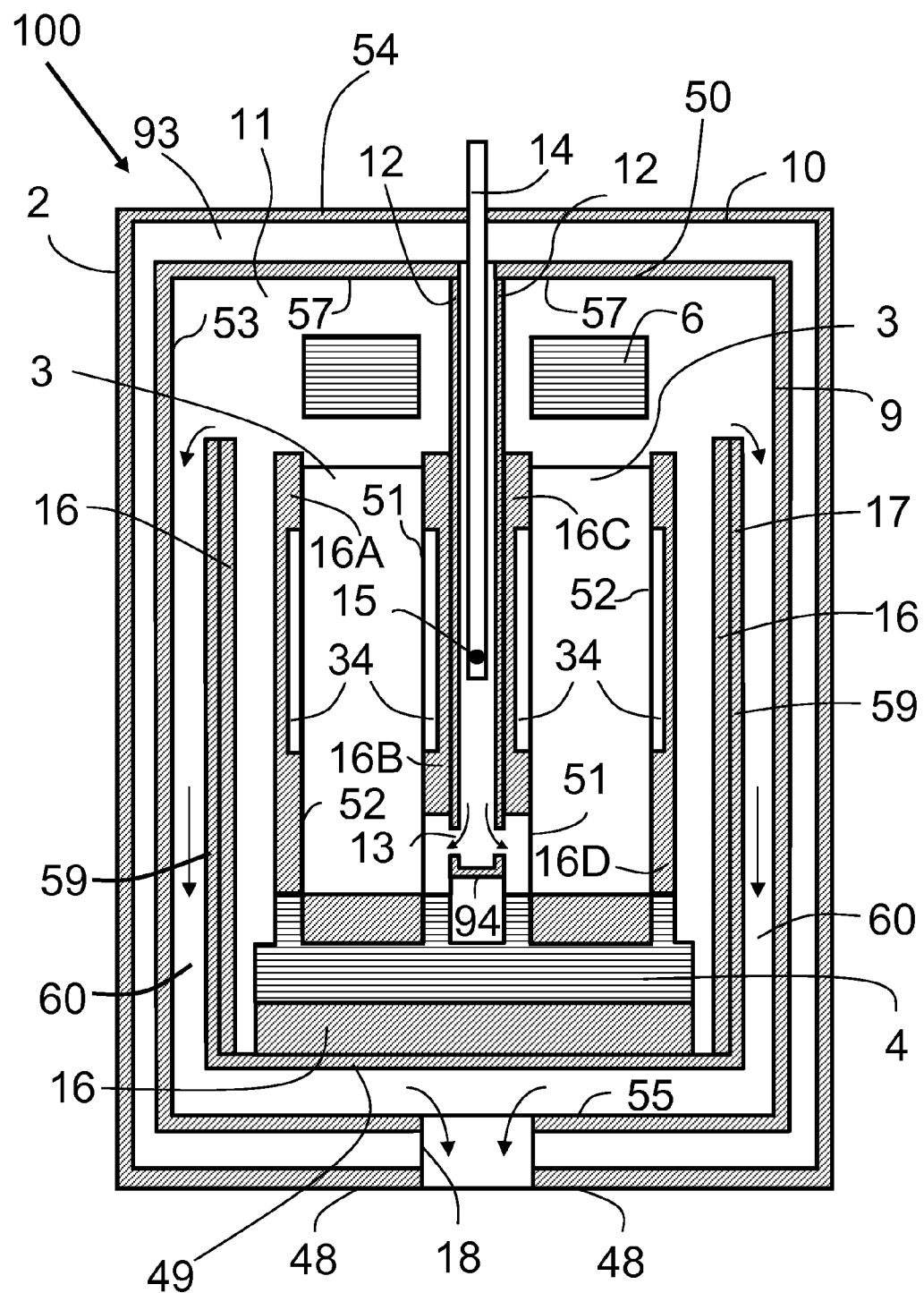
FIG. 2 is an illustration of a cross-sectional view of an exemplary fuel cell module taken along a line A-A in FIG. 1.

FIG. 2 is an illustration of a cross-sectional view of the module 100 taken along a line A-A in FIG. 1. The housing 2 comprises a double-layered structure comprising an inner wall 9 and an outer wall 10. The outer wall 10 comprises an outer frame of the housing 2, and the inner wall 9 substantially surrounds an electricity generation chamber 11, which houses the fuel cells 3 comprising the cell stacks 5 of the cell stack assembly 8.

A space 93 between the inner wall 9 and the outer wall 10 in the module 100 comprises a flow passage 93 (space 93) through which a reactant gas is introduced into the fuel cells 3. The reactant gas, such as air (an oxygen-containing gas), can be introduced into the fuel cells 3 through the flow passage.

The module 100 comprises a reactant gas inlet 12 through which a reactant gas is introduced into the cell stacks 5. Air can be introduced into the fuel cells 3 through the reactant gas inlet 12. The reactant gas inlet 12 extends from a top surface 50 of the inner wall 9 to side faces 51/52 of the cell stacks 5 and is coupled to the flow passage 93 between the inner wall 9 and the outer wall 10. A length of the reactant gas inlet 12 corresponds to a length of the cell stacks 5 in the array direction 104 of the fuel cells 3.

The reactant gas inlet 12 comprises an outlet 13 for introducing air into the fuel cells 3 at its lower end. The reactant gas inlet 12 comprises a pair of plates, which are juxtaposed to each other forming a passage for inlet gas. A bottom plate 94 may be attached to the lower ends of the pair of plates. The reactant gas inlet 12 is positioned between the two cell stacks 5 in the housing 2. Depending on a number of the cell stacks 5, for example in this embodiment, two reactant gas inlets 12 may be positioned to sandwich the cell stacks 5.

A temperature sensor 14 is inserted in the reactant gas inlet 12 from the top 54 of the housing 2 such that a temperature-measuring portion 15 of the temperature sensor 14 is located in the reactant gas inlet 12. The temperature sensor 14 may be, for example but without limitation, a thermocouple, and the like.

The fuel cells 3 may be operated at a predetermined temperature range. It is therefore necessary to measure the internal temperature of the electricity generation chamber 11, preferably the temperature of the cell stacks 5 or the neighborhood thereof, and control the temperature. In the case that the fuel cells 3 are solid oxide fuel cells, since the operating temperature is significantly high, it is particularly necessary to measure and control the temperature. The temperature sensor 14 may therefore be placed such that the temperature-measuring portion 15 can measure the temperature of a central portion 56 (FIG. 1) of the cell stacks 5. The central portion 56 is located in the array direction 104 at about half the height 106 of the fuel cells 3 at which the cell stacks 5 have substantially the highest temperature. In this manner, temperature in the neighborhood of the cell stacks 5 can effectively be measured and controlled. The effective measurement and control of the temperature allows the generation of electricity less likely to decrease and make the fuel cells 3 of the cell stacks 5 less likely to damage due to degradation or thermal stress. The module 100 comprises heat insulators 16 in the electricity generation chamber 11 to maintain the internal temperature of the module 100 at high temperature. The heat insulators 16 can reduce excessive dissipation of internal heat of the module 100, an excessive decrease in the temperature of the fuel cells 3 of the cell stacks 5, and a decrease in the generation of the electricity. The heat insulators 16 may be a heat-insulating material having a high electrical resistance, and the like.

The heat insulators 16 are positioned in a neighborhood of the cell stacks 5 to maintain the temperature of the fuel cells 3 of the cell stacks 5 at high temperature. In particular, as illustrated in FIG. 2, the heat insulators 16 are juxtaposed to the side surfaces 51/52 of the cell stacks 5 in the array direction 104. In this manner, the heat insulators 16 can effectively reduce an excessive decrease in the temperature of the cell stacks 5.

In the embodiment shown in FIG. 2, the module 100 comprises four heat insulators 16A, 16B, 16C, and 16D each facing the side surfaces 51/52 of the cell stacks 5. The heat insulators 16A and 16D are positioned between the side surfaces 52 of cell stacks 5 and the inner wall 9 of the housing 2. The heat insulators 16B and 16C are positioned between the side surfaces 51 of the cell stacks 5 and the reactant gas inlet 12.

Heat insulators 16A and 16D may have a size approximately equal to or larger than the size of side surfaces 52 of the cell stacks 5 substantially surrounding the fuel cells 3. The heat insulators 16 can make air (an oxygen-containing gas) from the reactant gas inlet 12 less likely to be discharged from the side surfaces 51/52 of the cell stacks 5. This can facilitate the flow of air in the periphery of the fuel cells 3.

In this document, the phrase "a size approximately equal to or larger than the size of a side surfaces of each of the cell stacks 5", as used herein, refers to a size having a length of about 90% or more of the length of each of the cell stacks 5 in the array direction 104 and a height of about 90% or more of the height 106 of each of the cell stacks 5.

The inner wall 9 comprises inner wall side surfaces 53 (internal sides) in the array direction 104, the inner wall bottom 55 (internal bottom) substantially perpendicular to the inner wall side surfaces 53, and inner wall top 57 (internal top) facing the inner wall bottom 55. The module 100 further comprises an exhaust gas inner wall 59 of exhaust gas vent 17 juxtaposed to the inner wall bottom 55 and the inner wall side surfaces 53 of the inner wall 9 at a predetermined distance. The space 60 between the exhaust gas inner wall 59 of the exhaust gas vent 17 and the inner wall bottom 55 and the inner wall side surfaces 53 of the inner wall 9 forms an exhaust gas passage 60 (space 60). The exhaust gas passage 60 fluidically communicates with an exhaust port 18 at the bottom 48 of the housing 2.

In practice, an exhaust gas generated at startup of the module 100, during the generation of electricity and at shutdown, flows through the exhaust gas passage 60 and is discharged from the exhaust port 18.

The exhaust port 18 may be formed by boring a hole or providing a pipe in the bottom 48 of the housing 2.

Figure 3:
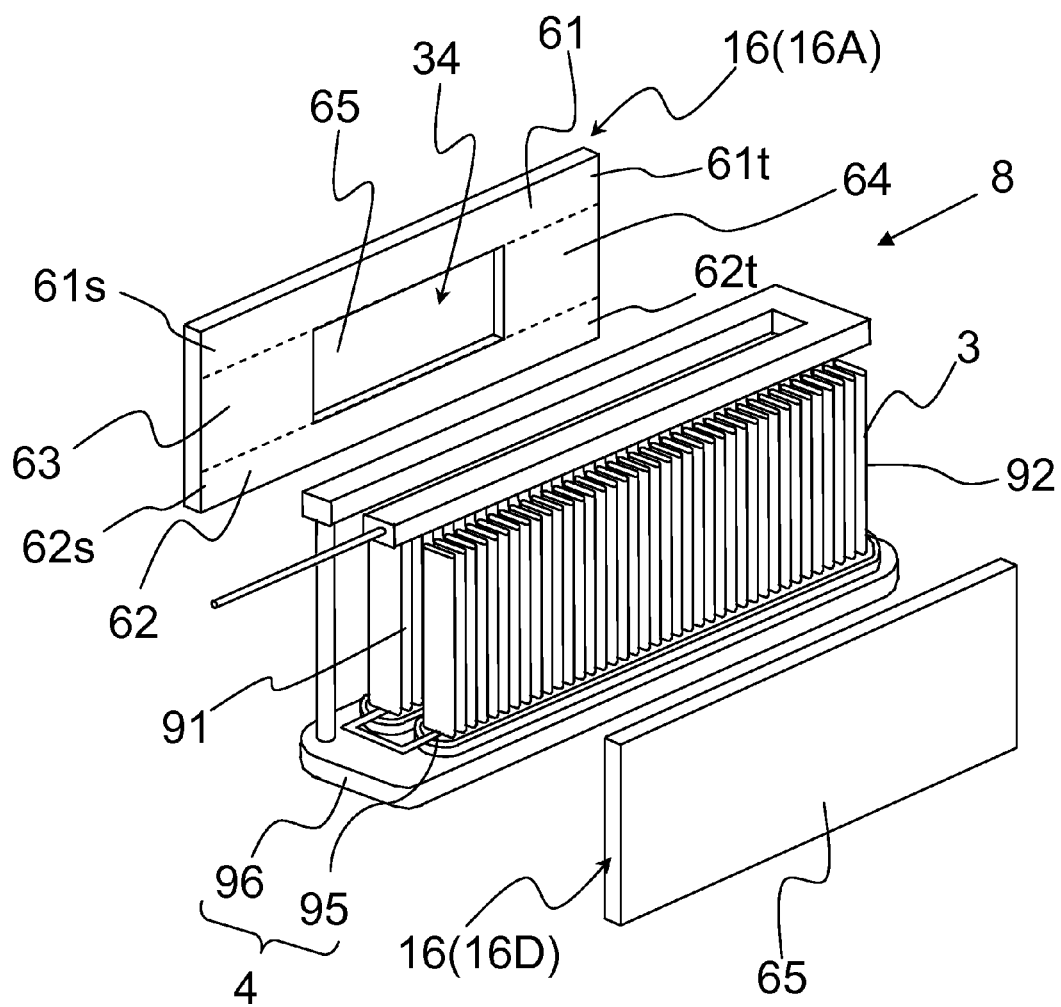
FIG. 3 is an illustration of a schematic perspective view of an exemplary cell stack assembly and heat insulators located on a side surface of the cell stack of the fuel cell module shown in FIG. 2.

FIG. 3 is an illustration of a schematic perspective view of an exemplary cell stacks assembly and the heat insulators 16A/16D located on a side surfaces 52 of the cell stacks 5 of the module 100 shown in FIG. 2. In the embodiment shown in FIGS. 2 and 3, the heat insulators 16 are juxtaposed to the side surfaces 51/52 of the cell stacks 5 in the array direction 104. Each of the heat insulators 16 is formed of a single plate material and comprises a depressed portion 34. The depressed portion 34 approximately faces the central portion 56 of the side surfaces 52 of the cell stacks 5 in the array direction 104.

In an embodiment, each of the four heat insulators 16A, 16B, 16C, and 16D comprises the depressed portion 34. In this manner, each of the heat insulators 16 such as the heat insulator 16A/16D shown in FIG. 3 and 16B/16C not shown in FIG. 3 comprises a first portion 61, a second portion 62, a third portion 63, a fourth portion 64, and a fifth portion 65. The first portion 61 faces an upper portion of each of the side surfaces 52 of the cell stacks 5. The second portion 62 is separated from the first portion 61 and faces a lower portion of the each of the side surfaces 52 of the cell stacks 5. The third portion 63 couples a first end 61s of the first portion 61 to a first end 62s of the second portion 62. The fourth portion 64 couples a second end 61t of the first portion 61 to a second end 62t of the second portion 62. The fifth portion 65 faces the cell stacks 5 with the first to fourth portions 61 to 64 interposed therebetween and covers an opening surrounded by the first to fourth portions 61 to 64. A portion surrounded by the first to fifth portions 61 to 65 comprises the depressed portion 34.

Each of the heat insulators 16 comprise a depressed portion 34 facing the respective side surfaces 51/52 of the cell stacks 5. Heat resulting from the generation of electricity in the cell stacks 5 can be dissipated via the depressed portions 34. The depressed portions 34 can therefore decrease the temperature of the fuel cells 3 facing the depressed portions 34. This can decrease the temperature difference between the ends 91/92 and the central portion 56 of the cell stacks 5. In this manner, the temperature distribution of the cell stacks 5 can be closer to uniform.

Since the depressed portion 34 approximately faces the central portion 56 of the side surfaces 51/52 of the cell stacks 5 in the array direction 104, the depressed portion 34 can appropriately decrease the temperature of the fuel cells 3 around the central portion 56 of the cell stacks 5 in the array direction 104.

An oxygen-containing gas such as air supplied from the lower end 102 of the cell stacks 5 through the reactant gas inlet 12 flows through the fuel cells 3 to the upper end 101 of the cell stacks 5 and partly flows into the depressed portions 34. Air in the depressed portion 34 circulates in the depressed portion 34 in response to the temperature distribution of the fuel cells 3 facing the depressed portion 34.

This can make the temperature distribution of the fuel cells 3 facing the depressed portion 34 closer to uniform. Consequently, the temperature distribution of the cell stacks 5 can be closer to uniform.

As described above, the heat insulators 16A and 16D may have a size approximately equal to or larger than a size of side surfaces 51/52 of the cell stacks 5. This allows air to be efficiently supplied to the fuel cells 3 and can reduce an excessive decrease in the temperature of the cell stacks 5.

A size of the depressed portion 34 can be appropriately determined on the basis of the shape of the fuel cells 3 in the cell stacks 5, the length of the cell stacks 5 in the array direction 104, and the temperature distribution of the cell stacks 5. More specifically, a length of the depressed portion 34 in the array direction 104 may be about 60% or more or about 75% or more of the length of each of the cell stacks 5 in the array direction 104. A height of the depressed portion 34 in the height 106 direction of the fuel cells 3 may be about 50% or more or about 70% or more of the height of the electricity generation portion (not shown) of the fuel cells 3. For example, in the case of hollow plate type fuel cells 3 that comprise a fuel-side electrode, a solid electrolyte, and an oxygen-side electrode positioned on a supporting substrate in this order, the height of the electricity generation portion (not shown) corresponds to a height of the oxygen-side electrode (not shown). The depressed portion 34 may have a depth that allows air in the depressed portion 34 to circulate well in the depressed portion 34 and may be about 50% or more of a thickness of the heat insulators 16. The depressed portion 34 may be symmetrical about the central portion 56 of the side surfaces 51/52 of the cell stacks 5 in the array direction 104.

Figure 4:
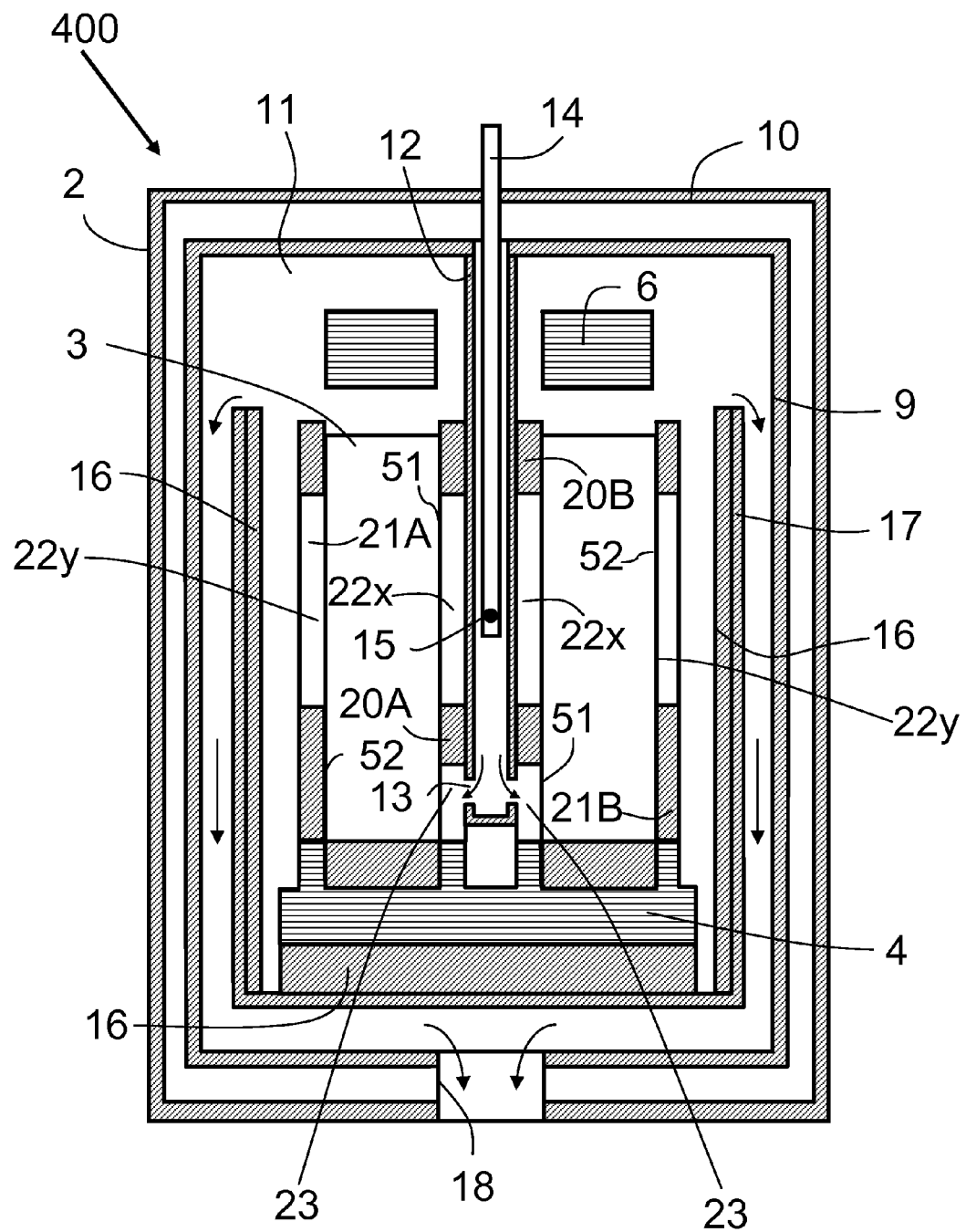
FIG. 4 is an illustration of a cross-sectional view of an exemplary fuel cell module according to an embodiment of the disclosure.
Figure 5A:
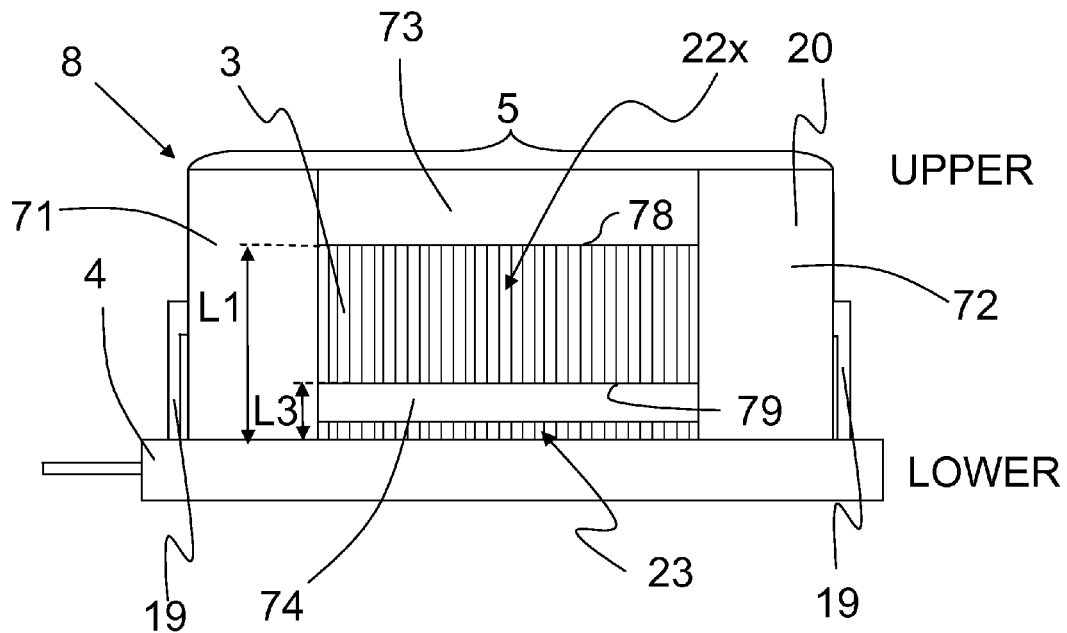
FIG. 5A is an illustration of a side view of an exemplary cell stack assembly and a heat insulator of the fuel cell module shown in FIG. 4, viewed from a first side of a reactant gas inlet.
Figure 5B:
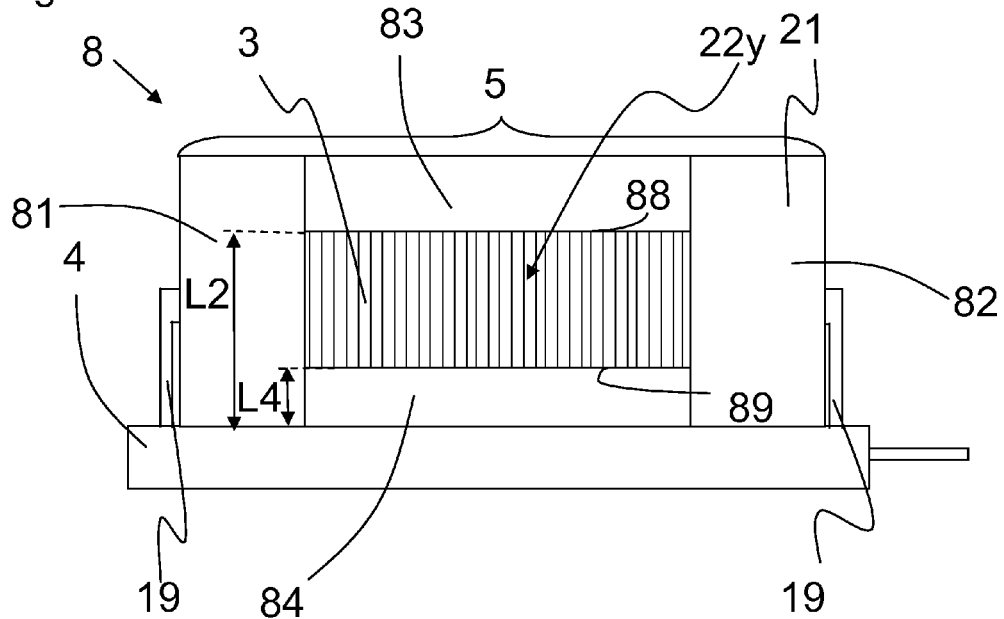
FIG. 5B is an illustration of a side view of an exemplary cell stack assembly and a heat insulator of the fuel cell module shown in FIG. 4, viewed from a second side of a reactant gas inlet of FIG. 5A.

FIG. 4 is an illustration of a cross-sectional view of an exemplary fuel cell module 400 (module 400) according to an embodiment of the disclosure. FIGS. 5A and 5B are side views of the cell stack assembly 8, a heat insulator 20 and a heat insulator 21 placed on the side surfaces 51/52 of the cell stacks 5 of the cell stack assembly 8 shown in FIG. 4. FIG. 5A is viewed from a first side of the reactant gas inlet 12, and FIG. 5B is viewed from a second side of the reactant gas inlet 12. Module 400 may have functions, material, and structures that are similar to the module 100. Therefore common features, functions, and elements may not be redundantly described here. The fuel cell module 400 is different from the module 100 in the structure of the heat insulators positioned on the side surfaces 51/52 of the cell stacks 5.

In FIGS. 5A and 5B, the reformer 6 is not shown. The cell stacks 5 comprise, at each end 91/92, a current collector 19 for receiving electric power generated by the cell stacks 5.

As illustrated in FIGS. 5A and 5B, the module 400 comprises heat insulator 20 and heat insulator 21 juxtaposed to the side surfaces 51/52 of the cell stacks 5 in the array direction 104. The heat insulator 20 comprises a plurality of heat-insulating plates 71, 72, 73, and 74. The heat insulator 21 comprises a plurality of heat-insulating plates 81, 82, 83, and 84. The heat-insulating plates 71 to 74 and the heat-insulating plates 81 to 84 correspond to the first to fourth portions 61 to 64 in the embodiment shown in FIG. 3.

The module 400 further comprises an opening 22 comprising openings 22x and 22y. The opening 22x is surrounded by heat-insulating plates 71-74 of the heat insulator 20 and the opening 22y is surrounded by plates 81-84 of the heat insulator 21. The openings 22x and 22y each face approximately the central portion 56 of the side surfaces 51/52 of the cell stacks 5 in the array direction 104. Unlike the module 100, the side surfaces 51/52 of the cell stacks 5 facing the opening 22x/22y respectively are not covered with the heat insulator 20/21. That is, the side surfaces 51/52 of the cell stacks 5 are partially exposed.

Although the heat insulator 20 and the heat insulator 21 surrounding the opening 22x/22y comprise a plurality of plates, the heat insulator 20 and the heat insulator 21 may be a single plate, as in the heat insulator 16 in the embodiment shown in FIG. 3. More specifically, the heat insulator 20 and the heat insulator 21 may be a single heat-insulating plate having an opening. The opening 22 can easily be formed for both a heat insulator comprising a plurality of plates and a heat insulator comprising a single plate.

As described above the heat insulators 20 and 21 comprising the opening 22 face the respective side surfaces 51/52 of the cell stacks 5. In this manner, heat resulting from the generation of electricity in the cell stacks 5 can be dissipated via the opening 22. The opening 22 can therefore decrease the temperature of the fuel cells 3 facing the opening 22. This can decrease the temperature difference between the ends 91/92 (FIG. 6A-6B) and the central portion 56 of the cell stacks 5. In this manner, the temperature distribution of the cell stacks 5 can be closer to uniform.

The opening 22 approximately faces the central portion 56 of the side surfaces 51/52 of the cell stacks 5 in the array direction 104. The opening 22 can therefore appropriately decrease the temperature of the fuel cells 3 around the central portion 56 of the cell stacks 5 in the array direction 104.

In the module 100 and the module 400, air (an oxygen-containing gas) supplied from the lower end 102 of the cell stacks 5 through the reactant gas inlet 12 flows through the fuel cells 3 to the upper end 101 of the cell stacks 5 and partly flows into the opening 22. Air in the opening 22x/22y circulates in the opening 22x/22y in response to the temperature distribution of the fuel cells 3 facing the respective opening 22x/22y.

In this manner, a temperature distribution of the fuel cells 3 facing the opening 22 can be closer to uniform. Consequently, the temperature distribution of the cell stacks 5 can be closer to uniform. In addition, this can make the generation of electricity in the cell stacks 5 less likely to decrease and make the fuel cells 3 in the cell stacks 5 less likely to damage.

The heat insulators 20 and 21 may have a size approximately equal to or larger than the size of side surfaces 51/52 of the cell stacks 5. This allows air to be efficiently supplied to the fuel cells 3 and can reduce an excessive decrease in the temperature of the cell stacks 5.

The size of the opening 22x/22y can be appropriately determined on the basis of the shape of the fuel cells 3 in the cell stacks 5, the length of the cell stacks 5 in the array direction 104, and the temperature distribution of the cell stacks 5. More specifically, the length of the opening 22x/22y in the array direction 104 may be about 60% or more or about 75% or more of the length of each of the cell stacks 5 in the array direction 104. The height of the opening 22x/22y in the height 106 direction may be about 50% or more or about 70% or more of the height of an electricity generation portion of the fuel cells 3. For example, in the case of hollow plate type fuel cells 3, the height of the electricity generation portion corresponds to the height of the oxygen-side electrode.

The opening 22x/22y may be symmetrical about the central portion 56 of the side surfaces 51/52 of the cell stacks 5 in the array direction 104.

In the embodiment shown in FIG. 4, the module 400 comprises four heat insulators 20A, 21A, 20B, and 21B each facing the respective side surfaces 51/52 of the cell stacks 5.

The heat insulators 20A and 20B face the side surfaces 51 and are positioned on the side of the reactant gas inlet 12 and the heat insulators 21A and 21B face the side surfaces 52 and are positioned on the side of the inner wall 9 of the housing 2. Each of the four heat insulators 20A, 21A, 20B, and 21B comprise the respective opening 22x/22y. The heat insulators 20A and 20B each comprise the opening 22x and the heat insulators 21A and 21B each comprise the opening 22y.

As illustrated in FIGS. 5A and 5B, the opening 22x is surrounded by the heat-insulating plates 71 to 74 of the heat insulator 20, and the opening 22y is surrounded by the plates heat-insulating 81 to 84 of the heat insulator 21.

Distance L1 between an upper end 78 of the opening 22x and the surface of the manifold 4 may be substantially the same as distance L2 between an upper end 88 of the opening 22y and the surface of the manifold 4. Distance L3 between a lower end 79 of the opening 22x and the surface of the manifold 4 may be substantially the same as the distance L4 between a lower end 89 of the opening 22y and the surface of the manifold 4. The opening 22x may have substantially the same shape as the opening 22y.

In an embodiment, as illustrated in FIG. 5A, the heat insulator 20 adjacent to the reactant gas inlet 12 further comprises an additional opening below the opening 22. The additional opening is a reactant gas introducing portion 23 for introducing a reactant gas from the reactant gas inlet 12 into the fuel cells 3. More specifically, a reactant gas from the reactant gas inlet 12 is introduced from the reactant gas introducing portion 23 into the periphery of the fuel cells 3 (between the fuel cells 3), flows upward in the height 106 direction, and is used for the generation of electricity in the fuel cells 3.

In the present embodiment, as described above, a reactant gas introduced from the reactant gas inlet 12 into the fuel cells 3 is air.

An excess oxygen-containing gas such as air flowing upward between the fuel cells 3 in the height 106 direction, together with excess fuel gas flowing from the gas passage (not shown) within the fuel cells 3, can be burned at the upper end 101 of the cell stacks 5. This can efficiently increase the temperature of the reformer 6 positioned above the cell stacks 5 as shown in FIG. 1, promoting reforming in the reformer 6.

In the case that unused fuel gas and unused air in the generation of electricity in the fuel cells 3 are burned at the upper end 101 of the cell stacks 5, the opening 22x/22y approximately faces the central portion 56 of the side surfaces 51/52 of the cell stacks 5 in the height 106 direction and may broaden toward the upper end 101. In other words, the opening 22x/22y may be longer at the upper end 101 than at the lower end 102.

In this manner, the temperature of the upper end 101 of the cell stacks 5 is less likely to increase excessively because of a combustion reaction at the upper end 101 of the cell stacks 5. This can also make the temperature of the lower end 102 of the fuel cells 3 less likely to decrease excessively because of excessive introduction of air from the reactant gas inlet 12 through the reactant gas introducing portion 23 at the lower end 102 of the fuel cells 3.

Thus, extending the opening 22x/22y toward an upper end of the opening 22 can decrease the temperature of the upper end 101 of the fuel cells 3 and result in the temperature of the lower end 102 of the fuel cells 3 less likely to decrease excessively. Consequently, the temperature distribution in the height 106 direction can be closer to uniform.

As illustrated in FIG. 5A, the heat insulator 20 comprises a plurality of plates, and the reactant gas introducing portion 23 is surrounded by the heat-insulating plates 71, 72, and 74 of the heat insulator 20 and the manifold 4. If the heat insulator 20 is a single plate, the reactant gas introducing portion 23 may be an indentation at the lower end of the heat insulator 20.

Each of the module 100 and the module 400 comprises a plurality of heat insulators adjacent to the side surfaces 51/52 of the cell stacks 5. More specifically, each of the module 100 and the module 400 comprises four heat insulators facing the side surfaces 51/52 of the two cell stacks 5.

As explained above all the four heat insulators 16 facing respective side surfaces 51/52 of the cell stacks 5 comprise the depressed portion 34 in the module 100 and all the four heat insulators 20/21 facing respective side surfaces 51/52 of the cell stacks 5 comprise the opening 22x/22y in the module 400. However, in one embodiment, at least one of the heat insulators facing each of the side surfaces 51/52 of the cell stacks 5 may comprise the depressed portion 34 in the module 100 or the opening 22x/22y in the module 400. To facilitate the flow of air, the heat insulators adjacent to the reactant gas inlet 12 may comprises the depressed portion 34 or the opening 22.

The heat insulators 16/20/21 adjacent to the side surfaces 51/52 of the cell stacks 5 may be appropriately positioned based on the number of cell stacks 5 in the housing 2 and the number of reactant gas inlets 12. For example, in a fuel cell module that comprises two cell stacks 5 juxtaposed to each other and the reactant gas inlets 12 at the outsides of the cell stacks 5, heat insulators 16/20/21 may be positioned between the reactant gas inlets 12 and the cell stacks 5 and between the cell stacks 5.

Figure 6A:
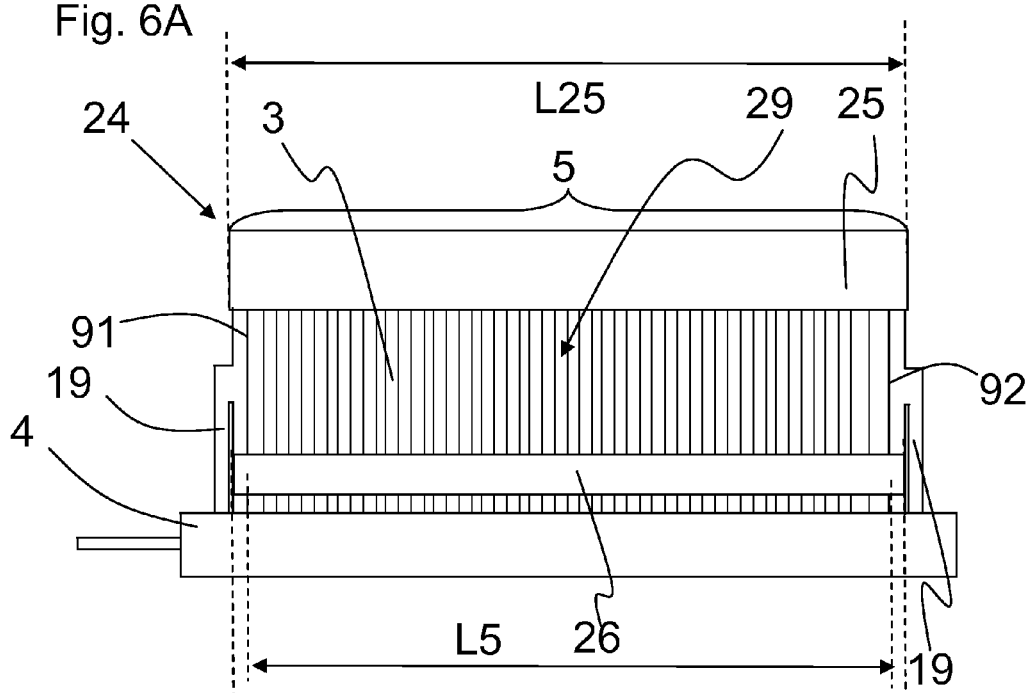
FIG. 6A is an illustration of a side view of an exemplary cell stack assembly and a heat insulator of a fuel cell module viewed from a first side of a reactant gas inlet according to an embodiment of the disclosure.
Figure 6B:
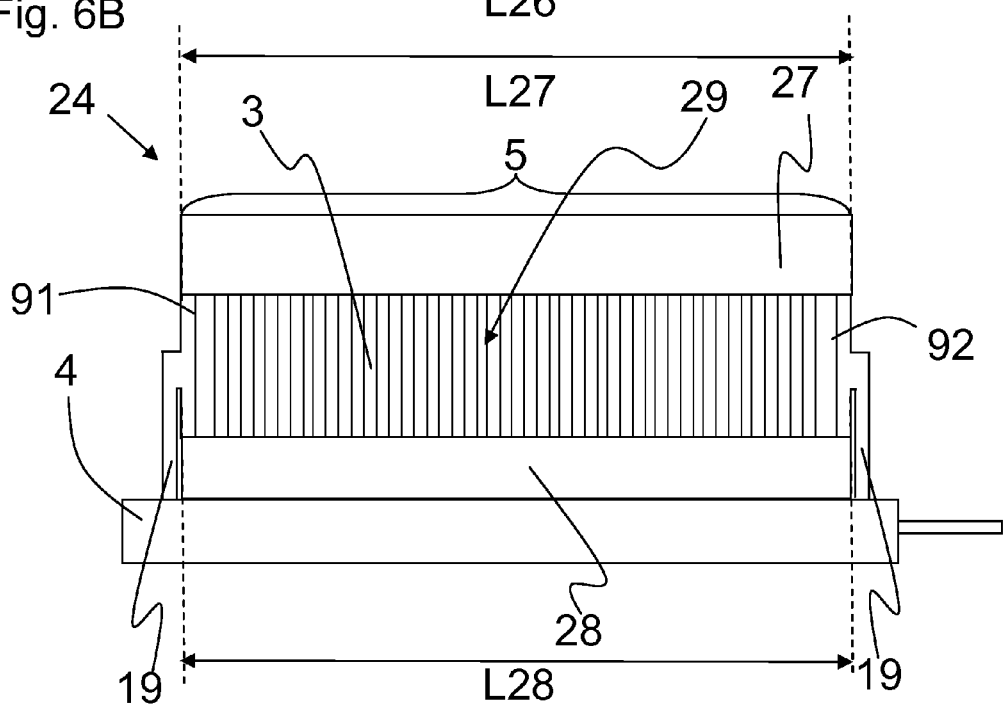
FIG. 6B is an illustration of a side view of a cell stack assembly and a heat insulator of a fuel cell module viewed from a second side of a reactant gas inlet of FIG. 6A according to an embodiment of the disclosure.

FIGS. 6A and 6B are illustrations of an exemplary cell stack assembly 24 to be housed in the housing 2 and heat insulators adjacent to the side surfaces 51/52 of the cell stacks 5 in a fuel cell module 600 according to an embodiment of disclosure. FIG. 6A is an illustration of a side view of the cell stack assembly 24 viewed from a first side of the reactant gas inlet 12, and FIG. 6B is an illustration of a side view of the cell stack assembly 24 viewed from a second side of the reactant gas inlet 12. In FIGS. 6A and 6B, the reformer 6 is not shown, and the current collector 19 is positioned at each end 91/92 of the cell stacks 5.

In the cell stack assembly 24 illustrated in FIGS. 6A and 6B, heat insulators 25/26/27/28 face the upper end 101 and the lower end 102 of side surfaces 51/52 of the cell stack 5. In this manner, the heat insulators 25 and 27 are adjacent to the upper end 101 and the heat insulators 26 and 28 are adjacent to the lower end 102. The heat insulators 25 and 26 are separated vertically from each other and the heat insulators 27 and 28 are separated vertically from each other. First member FM includes heat insulators 25 and 26 and second member SM includes heat insulators 27 and 28.

More specifically, in FIG. 6A, a heat insulator 25 is adjacent to the upper end 101, and a heat insulator 26 is adjacent to the lower end 102. In FIG. 6B, a heat insulator 27 is adjacent to the upper end 101, and a heat insulator 28 is adjacent to the lower end 102.

The heat insulators 25, 26, 27, and 28 may have a length approximately equal to or longer than the length of the cell stack 5 in the array direction 104. The lengths L25, L26, L27, and L28 of the heat insulators 25, 26, 27, and 28 in the array direction 104 are larger than the length L5 of each of the cell stacks 5 in the array direction 104. A length approximately equal to or longer than the length of the cell stacks 5 refers to about 90% or more of the length of each of the cell stacks 5.

As mentioned above, in the cell stack assembly 24, the heat insulators 25 and 27 are adjacent to the upper end 101 of the cell stacks 5 and are separated (vertically separated) in the height 106 direction from the heat insulators 26 and 28 adjacent to the lower end 102 of the cell stacks 5. Thus, an opening 29 at which the side surfaces 51/52 of the cell stacks 5 is not covered with the heat insulators 25, 26, 27, and 28 is positioned between the vertically separated heat insulators 25 and 26, and 27 and 28 respectively.

Heat resulting from the generation of electricity in the cell stacks 5 can be dissipated via the opening 29. The opening 29 extends from one end 91 to the other end 92 of the side surfaces 51/52 of the cell stacks 5 in the array direction 104. In other words, the opening 29 passes through the cell stack assembly 24 along the side surfaces 51/52 of the cell stacks 5 in the array direction 104.

The length of each of the cell stacks 5 in the array direction 104 may be the length L5 between one end 91 and the other end 92 of the cell stacks 5 as shown in FIG. 6A.

The opening 29 can decrease the overall temperature of the fuel cells 3 in the cell stacks 5. Furthermore, air in the opening 29 circulates between the central portion 56 in the array direction 104, which has substantially the highest temperature in the cell stacks 5, and the ends 91 and 92, which have the substantially lowest temperature in the cell stacks 5. The air circulation decreases the temperature of the central portion 56 and increases the temperatures of the ends 91 and 92. Consequently, the temperature distribution of the cell stacks 5 can be closer to uniform.

The heat insulator 26 is separated from the surface of the manifold 4 so that a reactant gas from the reactant gas inlet 12 can be introduced to the periphery of the fuel cells 3 (between the fuel cells 3). In other words, the heat insulator 26 is separated in the height 106 direction from the manifold 4. Specifically, the heat insulator 26 is separated in the height 106 direction from the joint 95 (not shown in FIG. 6A) of the manifold 4.

When a heat insulator is placed to cover at least on a side surfaces 51/52 of the cell stacks 5 in the array direction 104 so as to make a space for the inflow and circulation of air from between the fuel cells 3, part of air between the fuel cells 3 circulates in the space. This can make the temperature distribution of the cell stacks 5 closer to uniform.

The heat insulators 16B/16C juxtaposed to the side surfaces 51 of the cell stacks 5 adjacent to the reactant gas inlet 12 and the heat insulators 16A/16D juxtaposed to the side surfaces 52 of the cell stacks 5 may be attached to the side surfaces 51/52 respectively and/or may form a continuous plate across the side surfaces 51/52 for each of the fuel cells 3. This allows the heat insulators to maintain their shapes for an extended period of time. In particular, the heat insulators can maintain the shape of the depressed portion 34 or the opening 22 or 29 for an extended period of time.

FIGS. 7A and 7B illustrate schematic perspective views of exemplary reactant gas inlet 702 and 704 that can be used as the reactant gas inlet 12 of the module 100 respectively according to two embodiments of the disclosure.

The reactant gas inlet 704 comprises a coupling member 30 for coupling a heat insulator adjacent to the reactant gas inlet 704, whereas the reactant gas inlet 702 does not comprise the coupling member 30.

When the heat insulator 20 comprising the opening 22 (FIG. 5A) is placed on a side surfaces 51/52 of the cell stacks 5 adjacent to the reactant gas inlet 12, the opening 22 may be securely coupled with the reactant gas inlet 12. This allows the heat insulator 20 to maintain the shape of the opening 22 for a long period of time even when it may be hard for the heat insulator 20 alone to maintain the shape of the opening 22 for an extended period of time, depending on the type and the strength of the heat insulator 20.

If the heat insulator 20 comprising the opening 22 has a sufficient strength, for example, when the heat insulator 20 is a heat-insulating board, the reactant gas inlet 702 can be used to secure the heat insulator 20 having the opening 22 against the reactant gas inlet 702. This allows the heat insulator 20 to maintain the shape of the opening 22 for a long period of time.

If the heat insulator 20 comprising the opening 22 has a low strength, for example, when the heat insulator 20 is heat-insulating wool, the reactant gas inlet 704 can be used. The reactant gas inlet 704 comprises the coupling member 30 for coupling a heat insulator, specifically, an opening 22. The heat insulator 20 comprising the opening 22 can be coupled with the coupling member 30 to attach the heat insulator 20 to the reactant gas inlet 704. This allows the heat insulator 20 having the opening 22 to maintain shape of the opening 22 for an extended period of time even when the heat insulator 20 having the opening 22 has a low strength.

In FIG. 7B, the coupling member 30 comprises three columnar members 30A, 30B, and 30C. The columnar members 30A and 30B are positioned in the height 106 direction. The columnar member 30C is positioned in the longitudinal direction of the reactant gas inlet 704 that is in the array direction 104, to couple the upper ends 706 of the columnar members 30A and 30B to each other.

The opening 22 of the heat insulator 20 has a shape adapted to the shape of the coupling member 30 such that the opening 22 is coupled with the coupling member 30. This allows the heat insulator 20 to maintain the shape of the opening 22 for an extended period of time. Thus, the opening 22 can be easily shaped by coupling the heat insulator 20 with the coupling member 30.

The coupling member 30 may have any shape adapted to the shape of the opening 22, for example but without limitation, rectangular, circular, elliptical, or triangular, and the like.

The reactant gas inlets 702 and 704 each comprise a plurality of outlets 13. The outlets 13 comprise holes through which air is introduced to the cell stacks 5. Distances d between adjacent holes are relatively small in a mid section 710 in the array direction 104 and relatively large at near ends 708 in the array direction 104. This structure allows more air/gas to be supplied to the central portion 56 than to the ends 91/92 of the cell stacks 5 (FIG. 1); dissipating heat more efficiently in the central portion 56 than at the ends 91/92 of the cell stacks 5. Consequently, the temperature distribution of the cell stacks 5 can be closer to uniform. The outlets 13 may be positioned at constant intervals from each other.

FIGS. 8A and 8B are illustrations of exemplary states in which a heat insulator 20 is coupled to a coupling member 30 according to two embodiments of the disclosure. In the embodiments shown in FIGS. 8A and 8B, a heat insulator 20 comprising an opening 22 is coupled with the reactant gas inlet 12 (704 FIG. 7B) via the coupling member 30. In the embodiment shown in FIG. 8A, the heat insulator 20 comprises a single plate comprising an opening. In the embodiment shown in FIG. 8B, the heat insulator 20 comprises a plurality of plates. In the embodiments shown in FIGS. 8A and 8B, a reactant gas introducing portion 23 is not shown.

The shape of the opening 22 of the heat insulator 20 is adapted to the shape of the coupling member 30 to couple the heat insulator 20 comprising the opening 22 with the coupling member 30, thereby attach the heat insulator 20 to the reactant gas inlet 12. In addition, the opening 22 can be easily shaped.

Whether the heat insulator 20 comprising the opening 22 is a single plate having an opening illustrated in FIG. 8A or a heat insulator comprising a plurality of plates illustrated in FIG. 8B, the heat insulator 20 can be appropriately formed in accordance with the shape of the housing 2 of the module 100/400.

For example, in the module 400 shown in FIG. 4, the heat insulator 20 comprising the opening 22 may comprise a plurality of plates shown in FIG. 8B. This facilitates the fabrication of the fuel cell module 400.

More specifically, the heat-insulating plates 71 and 72 can be placed on the left and right sides of the coupling member 30 respectively and the heat-insulating plates 73 and 74 can be placed on the top and bottom of the coupling member 30 respectively.

After the cell stack assembly 8 is slid into the housing 2, the upper and lower heat-insulating plates 73 and 74 are inserted into spaces between the cell stacks 5 and the reactant gas inlet 12. The upper heat-insulating plate 73 is inserted to be placed on the coupling member 30. This allows the upper heat-insulating plate 73 to be positioned on the coupling member 30. The lower heat-insulating plate 74 is placed on the manifold 4. The left and right heat-insulating plates 71 and 72 are inserted from both sides of the housing 2 between the cell stacks 5 and the reactant gas inlet 12 to bring the left and right heat-insulating plates 71 and 72 into contact with the coupling member 30. This allows the heat-insulating plates 71, 72, 73, and 74 to be easily attached in the housing 2.

In this case, the upper heat-insulating plate 73 may have the same length as the coupling member 30 in the array direction 104. The upper ends 806 of the left and right heat-insulating plates 71 and 72 may be at the same height as the upper end 808 of the heat-insulating plate 73. The upper heat-insulating plate 73 and the lower heat-insulating plate 74 can be attached to the coupling member 30 by placing them between the left and right heat-insulating plates 71 and 72. The heat-insulating plates 71, 72, 73, and 74 may be attached to the coupling member 30 with an adhesive.

Figure 9A:
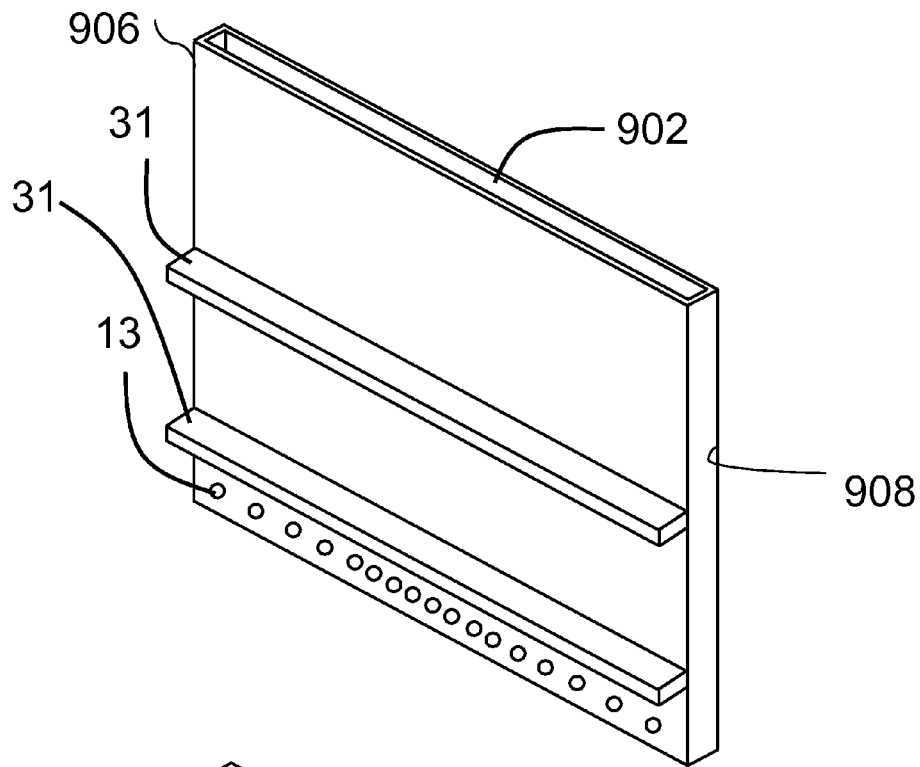
FIG. 9A is an illustration of a schematic perspective view of an exemplary reactant gas inlet according to an embodiment according to an embodiment of the disclosure.
Figure 9B:
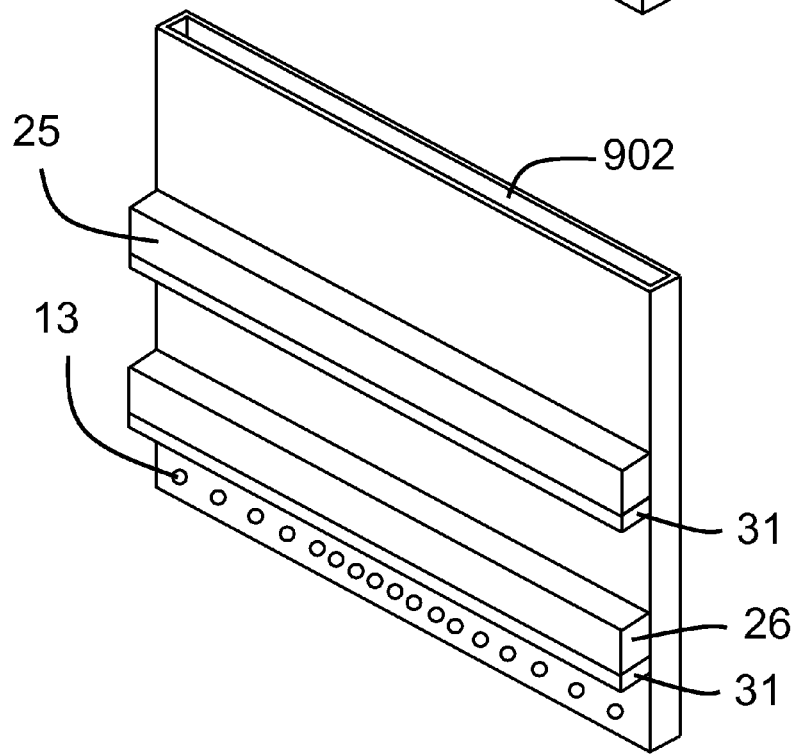
FIG. 9B is an illustration of an exemplary state in which heat insulators couple to the reactant gas inlet illustrated in FIG. 9A via a coupling member according to an embodiment of the disclosure.

FIG. 9A is an illustration of a schematic perspective view of an exemplary reactant gas inlet 902 according to an embodiment of the disclosure. FIG. 9B is an illustration of an exemplary state in which heat insulators 25 and 26 couple to the reactant gas inlet 902 of FIG. 9A via coupling members 31 according to an embodiment of the disclosure. In the embodiments shown in FIGS. 9A and 9B, the heat insulators 25 and 26 illustrated in FIG. 6A are coupled with the reactant gas inlet 902 in the module 600. In the embodiment shown in FIG. 9A the reactant gas inlet 902 comprises coupling members 31. In the embodiment shown in FIG. 9B, the heat insulators 25 and 26 are positioned on the coupling members 31.

The heat insulators 25 and 26 may have a length approximately equal to or longer than the length of each of the cell stacks 5 in the array direction 104. Thus, the coupling members 31 may extend from first end 906 to the second end 908 of the reactant gas inlet 902 in the array direction 104.

Thus, the opening 29 can be easily shaped by placing the heat insulators 25 and 26 on the coupling members 31, facilitating the fabrication of the fuel cell module 600.

More specifically, as in fabrication of the module 400 described above, after the cell stack assembly 24 is slid into the housing 2, the heat insulators 25 and 26 are inserted and placed on the coupling members 31.

Figure 10:
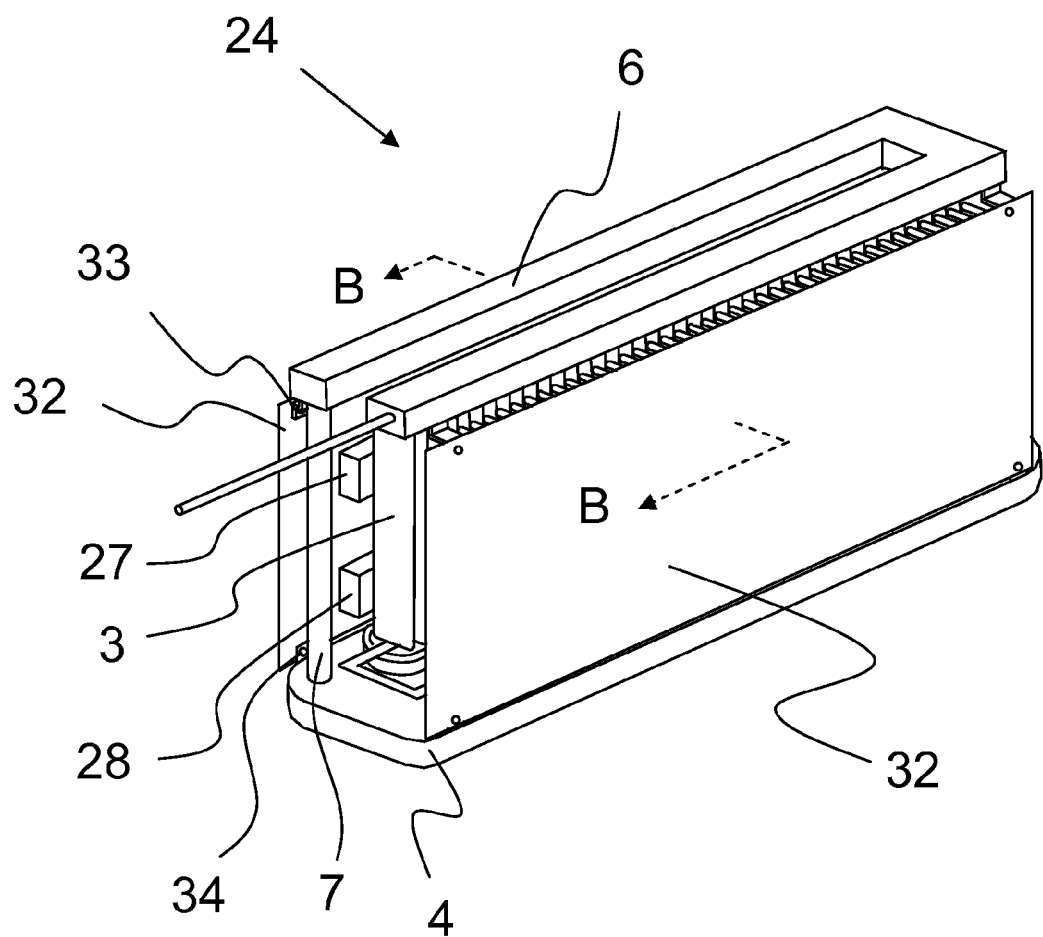
FIG. 10 is an illustration of a schematic perspective view of an exemplary fuel cell module according to an embodiment of the disclosure in which the housing and the like are not shown.
Figure 11:
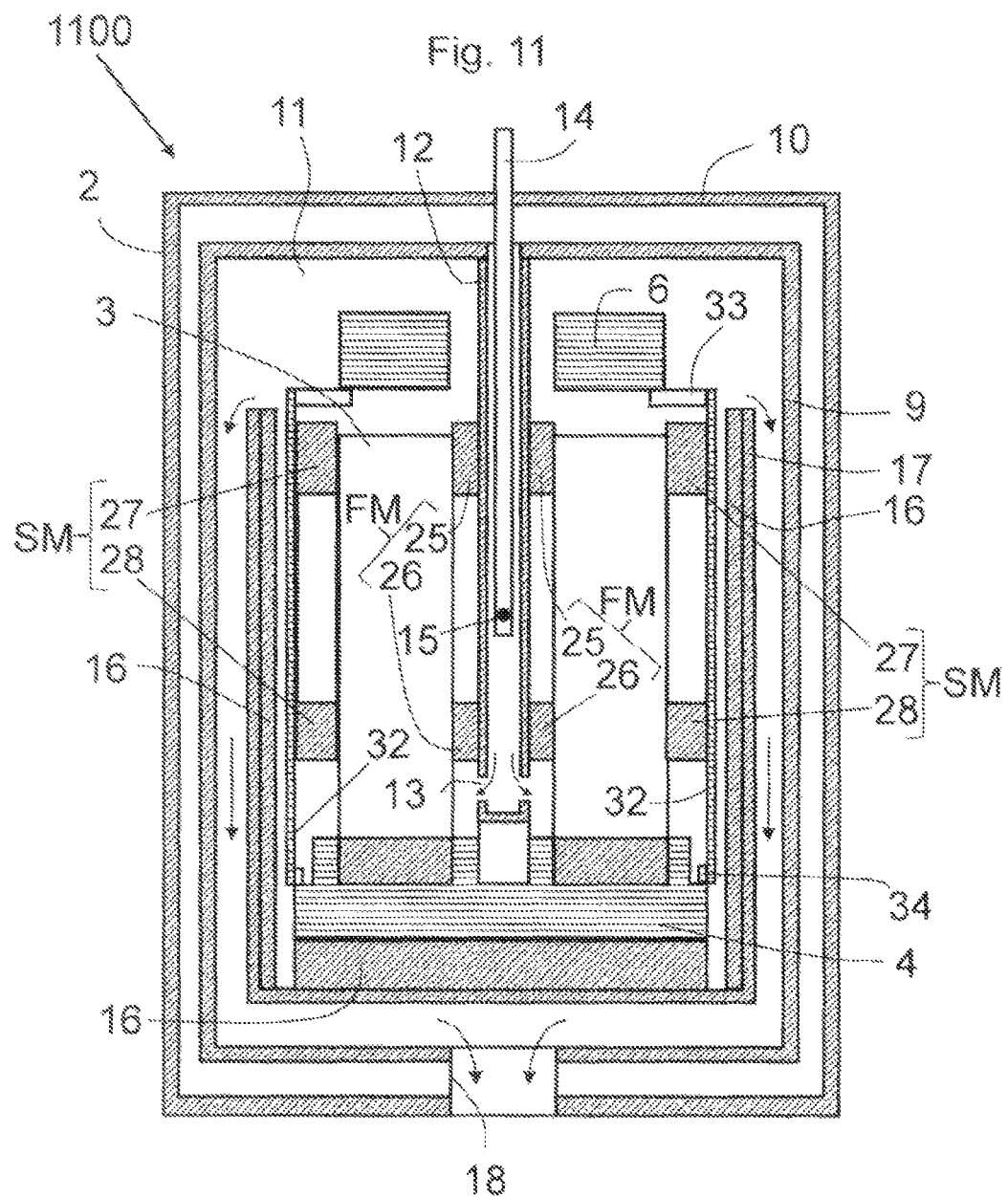
FIG. 11 is an illustration of a cross-sectional view of an exemplary fuel cell module with the cell stack assembly in the housing shown in FIG. 10 according to an embodiment of the disclosure.

FIG. 10 is an illustration of a schematic perspective view of an exemplary a fuel cell module 1100 (module 1100) according to an embodiment of the disclosure. The module 1100 comprises the housing 2, the cell stack assembly 24, the heat insulators 25/26/27/28 and an attaching member 32. In FIG. 10, the housing 2 and the like are not shown. In FIG. 10, the heat insulators 27 and 28 are attached with the attaching member 32 which faces the reactant gas inlet 12 (not shown) with the cell stacks 5 interposed therebetween. The heat insulators 25 and 26 are also attached with the attaching member 32 in the same way as the heat insulators 27 and 28 (not shown). FIG. 11 is an illustration of a cross-sectional view of the module 1100 shown in FIG. 10 taken along a line B-B in FIG. 10.

As illustrated in FIG. 10, a plate of the attaching member 32 faces the reactant gas inlet 12 with interposed therebetween the cell stacks 5. The heat insulators 27 and 28 are positioned between the cell stacks 5 and the fixing member 32. In other words, the attaching member 32 outside the cell stacks 5 is abutted against the heat insulators 27 and 28 to attach the heat insulators 27 and 28 to the cell stack assembly 24.

The attaching members 32 are coupled to attaching portions 33 of the reformer 6 and attaching portions 34 of the manifold 4, for example, with screws and the like. Thus, the attaching members 32 can be attached to the reformer 6 and the manifold 4, and substantially simultaneously the heat insulators 27 and 28 can be attached to the cell stack assembly 24. The attaching member 32 may be formed of any heat-resistant material, for example but without limitation, a metal such as stainless steel, and the like.

In the embodiments shown in FIG. 10, the attaching member 32 is attached to the reformer 6 and the manifold 4 through the attaching portions 33 and 34. Alternatively, the attaching member 32 may be partially bent so that the attaching member 32 can be attached directly to the reformer 6 and the manifold 4. The attaching member 32 may be attached to either the reformer 6 or the manifold 4.

Although the heat insulators 27 and 28 can be abutted against the attaching member 32 to be attached, the attaching member 32 may comprise a coupling member (not shown) for coupling the heat insulators 27 and 28. This can facilitate the fabrication of the module 1100.

As described above, the fuel cells 3 in the modules 100, 400, and 1100 may comprise solid oxide fuel cells that comprise a fuel-side electrode, a solid electrolyte, and an oxygen-side electrode positioned in this order on a supporting substrate.

The fuel cells 3 may comprise a gas passage (not shown) within the supporting substrate. In the cell stack assembly 8 shown in FIG. 1, a fuel gas produced in the reformer 6 passes through the gas flow pipe 7 and the manifold 4 and then flows through a gas passage (not shown) within the supporting substrate from the lower end 102 to the upper end 101. The fuel gas from the gas passage (not shown) reacts with air/gas from the reactant gas inlet 12, thus generating electricity.

The fuel cells 3 may have any shape, for example but without limitation, a plate, a cylinder, a hollow plate, and the like. To efficiently generate electricity with the fuel cells 3 in the cell stack 5, the fuel cells 3 may have a hollow plate shape.

Figure 12:
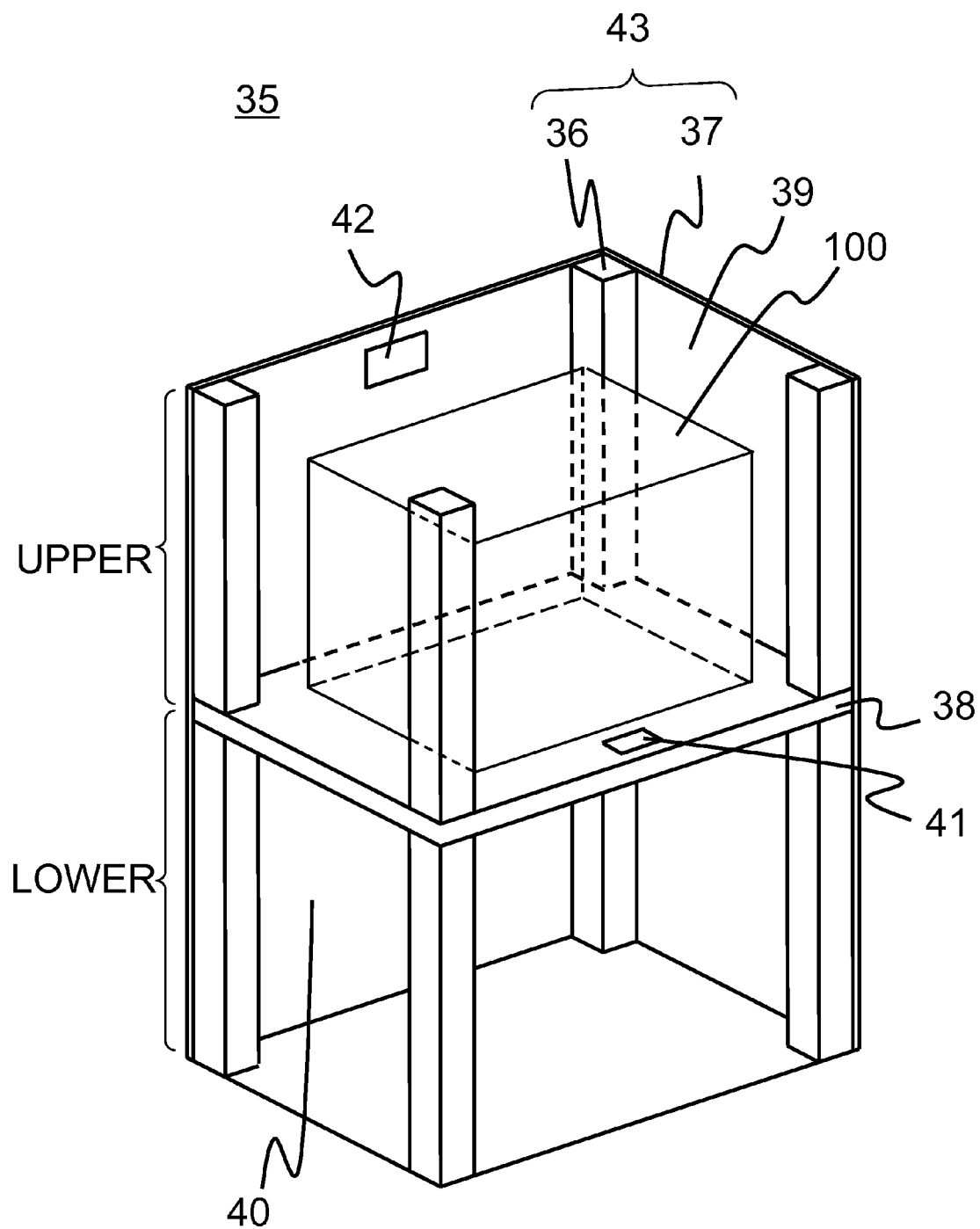
FIG. 12 is an illustration of an exploded perspective view of an exemplary fuel cell apparatus according to an embodiment of the disclosure.

FIG. 12 is an illustration of an exploded perspective view of an exemplary fuel cell apparatus 35 according to an embodiment of the disclosure. The fuel cell apparatus 35 comprises the module 100 illustrated in FIG. 1, auxiliaries for operating the module 100 (not shown), and a case 43, comprising props 36 and an outer casing 37, for housing the module 100. For sake of simplicity, in the embodiment shown FIG. 12 some components are not shown.

The fuel cell apparatus 35 further comprises a module storage 39 and an auxiliary storage 40, which are separated by a partition 38, in the case 43. The module storage 39 is positioned in the upper part of the case 43 and houses the module 1. The auxiliary storage 40 is positioned in the lower part of the case 43 and houses auxiliaries for operating the module 100. Examples of the auxiliaries housed in the auxiliary storage 40 (not shown in FIG. 12) comprise a water supply unit for supplying the module 100 with water and other supply units for supplying the module 100 with a fuel gas and air. These auxiliaries are not shown in FIG. 12.

The partition 38 comprises an air flow port 41 for sending air from the auxiliary storage 40 to the module storage 39. The module storage 39 comprises an air outlet 42 for exhausting air from the module storage 39.

The fuel cell apparatus 35 comprises the module 100 having improved power generation performance as described above. The fuel cell apparatus 35 can therefore achieve high power generation efficiency.

In the fuel cell apparatus 35, when the fuel cells 3 are solid oxide fuel cells, auxiliaries for operating the fuel cells 3, as well as the module 100, can be miniaturized. This results in miniaturization of the fuel cell apparatus 35. The fuel cell apparatus 35 comprising the solid oxide fuel cells 3 can operate under fluctuating load (load-following operation), which is required for household fuel cell apparatuses. The fuel cell apparatus 35 comprising the solid oxide fuel cells 3 can therefore be suitably used as a household fuel cell apparatus.

In the module 100, module 400 and the module 1100, a fuel gas (hydrogen-containing gas) flows through the gas passage (not shown) within the fuel cells 3, and air (an oxygen-containing gas) flows through the reactant gas inlet 12. Alternatively, air/gas may flow through the gas passage (not shown) within the fuel cells 3, and a fuel gas may flow through the reactant gas inlet 12. In other words, a gas flowing through the reactant gas inlet 12 may be air or a fuel gas, which is a reactant gas used for the generation of electricity.

In the module 400, the heat insulator 20 juxtaposed to the side surfaces 51/52 of the cell stacks 5 adjacent to the reactant gas inlet 12 is a single heat-insulating plate illustrated in FIG. 8A or a heat insulator comprising four plates illustrated in FIG. 8B. However, the heat insulator 20 may comprise two heat insulators: one comprises the reactant gas introducing portion 23 for introducing a reactant gas from the reactant gas inlet 12 into the cell stacks 5, and the other comprises the opening 22 approximately facing the central portion 56 of side surfaces 51/52 of the cell stacks 5.

In this case, the one comprising the reactant gas introducing portion 23 may be formed of a heat-insulating board, and the other having the opening 22 may be formed of heat-insulating wool.

EXAMPLES

A solid oxide fuel cell (hereinafter referred to as a fuel cell) was fabricated. The fuel cell comprised a supporting substrate, 10 gas passages within the supporting substrate, and a fuel-side electrode, a solid electrolyte, and an oxygen-side electrode positioned in this order on the supporting substrate.

The supporting substrate was a hollow plate type supporting substrate composed of about 48% by volume NiO and about 52% by volume $Y_2O_3$ and having a thickness of about 2 mm after firing-reduction.

The fuel-side electrode was formed by applying a mixture of a NiO powder, a $ZrO_2$ powder in which $Y_2O_3$ was dissolved as solid solution, an organic binder, and a solvent to the supporting substrate and drying the mixture.

The solid electrolyte was formed by applying $ZrO_2$ in which about 8% by mole Y was dissolved as solid solution to the fuel-side electrode layer and drying the $ZrO_2$.

After the fuel-side electrode and the solid electrolyte formed on the supporting substrate were calcined, a mixed interconnector material comprising a $LaCrO_3$ oxide, an organic binder, and a solvent was applied to the supporting substrate and was fired. A $La_{0.6}Sr_{0.4}Co_{0.2}Fe_{0.8}O_3$ oxygen-side electrode was baked on the solid electrolyte, thus fabricating the fuel cell 3.

Seventy fuel cells 3 thus fabricated were aligned at about 2.5 mm intervals to fabricate the cell stacks 5. The fuel cells 3 of the cell stacks 5 were attached at their lower end 102 to the manifold 4 with a glass sealant to fabricate a cell stack assembly 8.

After the cell stack assembly 8 was placed in the housing 2, heat insulators were placed on the side surfaces 51/52 of the cell stacks 5 to fabricate a module 100. The module 100 was subjected to a power generation test under conditions of AC of about 700 W, fuel utilization (Uf) of about 75%, and air utilization (Ua) of about 38%.

Figure 13:
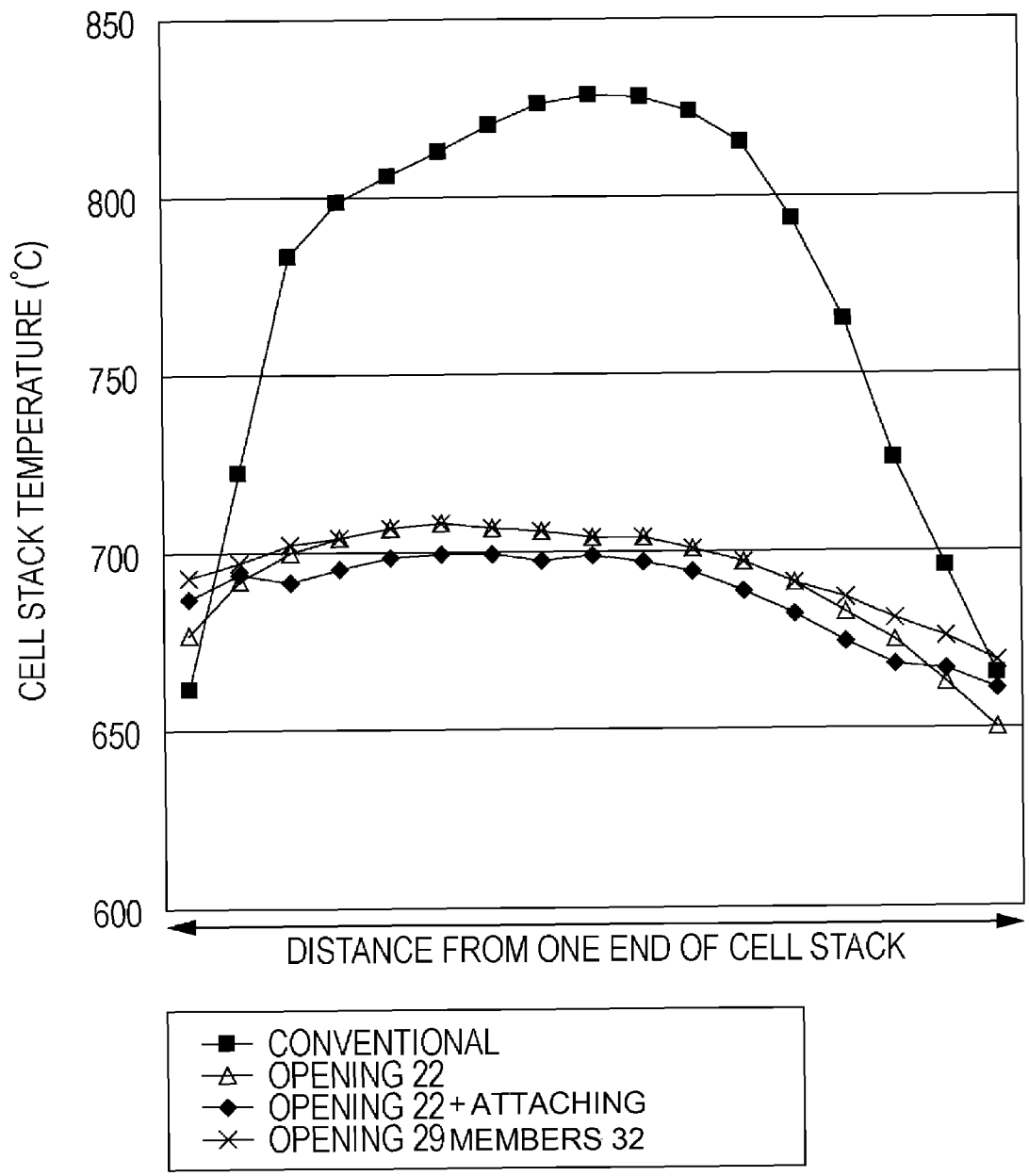
FIG. 13 is an illustration of a graph comprising exemplary results of an electricity generation test according to various embodiments of the disclosure.

FIG. 13 is a graph showing the results of an electricity generation test. In FIG. 13, "opening 22" in the legend means that the electricity generation test was performed with a module that comprised the cell stack assembly 8 illustrated in FIGS. 5A and 5B, "opening 22+attaching members 32" means that the electricity generation test was performed with a module that comprised the cell stack assembly 8 illustrated in FIGS. 5A and 5B and the attaching members 32 on both sides of the cell stack assembly 8, and "opening 29" means that the electricity generation test was performed with a module that comprised a cell stack assembly 24 illustrated in FIGS. 6A and 6B. "Conventional" means that the electricity generation test was performed with a module that comprised heat insulators having neither the opening 22 nor the opening 29.

The length of the opening 22 in the array direction 104 was about 75% of the length of each of the cell stacks 5, and the height of the opening 22 was about 60% of the height of the oxygen-side electrode in the fuel cell 3. The height of the opening 29 was about 60% of the height of the oxygen-side electrode in the fuel cell 3.

The temperatures of the cell stacks 5 were measured at about half the height of the fuel cells 3 in the array direction 104.

FIG. 13 shows that the conventional module that comprised heat insulators having neither the opening 22 nor the opening 29 on the side surfaces 51/52 of the cell stacks 5 had a temperature difference of approximately 160° C. between the ends 91/92 and the central portion 56 of the cell stacks 5. In contrast, the module that comprised heat insulators 20 having the opening 22 had a temperature difference of approximately about 60° C. between the ends 91/92 and the central portion 56 of the cell stacks 5. The installation of the heat insulators comprising the opening 22 made the temperature distribution of the cell stacks 5 closer to uniform.

The module that comprised the heat insulators having the opening 22 and the attaching members 32 had a temperature difference of about 40° C. between the ends 91/92 and the central portion 56 of the cell stacks 5. Installation of the attaching members 32 further made the temperature distribution of the cell stacks 5 closer to uniform.

The module that comprised the heat insulators comprising the opening 29 had a temperature difference of approximately 40° C. between the ends 91/92 and the central portion 56 of the cell stacks 5. Installation of the heat insulators at the upper end 101 and the lower end 102 of the side surfaces 51/52 of the cell stacks 5 made the temperature distribution of the cell stacks 5 closer to uniform.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A fuel cell module, comprising:
   a cell stack comprising a plurality of fuel cells arrayed adjacent to one another and having a cell stack length and a side surface with an upper portion and a lower portion;
   a heat insulator comprising:
      a first portion facing the upper portion, having a length approximately equal to or longer than the cell stack length, and including a first end and a second end;
      a second portion separated from the first portion, facing the lower portion, having a length approximately equal to or longer than the cell stack length, and including a first end and a second end;
      a third portion facing the side surface of the cell stack and coupling the first end of the first portion to the first end of the second portion; and
      a fourth portion positioned with a separation from the third portion, facing the side surface of the cell stack, and coupling the second end of the first portion to the second end of the second portion;
   an opening surrounded by the first portion, the second portion, the third portion, and the fourth portion;
   a housing for housing the cell stack and the heat insulator;
   the side surface of the cell stack including:
      a first side surface; and
      a second side surface on opposite side of cell stack from the first side surface, and
   the heat insulator including:
      a first member facing the first side surface and comprising the first portion, the second portion, the third portion, and the fourth portion; and
      a second member facing the second side surface and comprising the first portion, the second portion, the third portion, and the fourth portion;
   a reactant gas inlet including an outlet facing the first side surface of the cell stack,
   wherein the first member is located between the reactant gas inlet and the first side surface of the cell stack and the outlet is located under the first member.

2. The fuel cell module according to claim 1, wherein the fuel cells are solid oxide fuel cells.

3. The fuel cell module according to claim 1, wherein the side surface of the cell stack includes a central portion, and the opening faces the central portion.

4. The fuel cell module according to claim 1, further comprising:
   a first opening surrounded by the first to fourth portions of the first member, and comprising an upper end and a lower end; and
   a second opening surrounded by the first to fourth portions of the second member, and comprising an upper end and a lower end,
   wherein the fuel cells comprise a lower end, and
   wherein a first distance between the upper end of the first opening and the lower end of the fuel cells is approximately the same as a second distance between the upper end of the second opening and the lower end of the fuel cells.

5. The fuel cell module according to claim 4, wherein a third distance between the lower end of the first opening and the lower end of the fuel cells is approximately the same as a fourth distance between the lower end of the second opening and the lower end of the fuel cells.

6. The fuel cell module according to claim 4, wherein the first opening has approximately the same shape as the second opening.

7. A fuel cell module, comprising:
   a cell stack comprising a plurality of fuel cells arrayed adjacent to one another and having a cell stack length along a line formed by the fuel cells and a side surface with an upper portion and a lower portion, the cell stack length with a first end and a second end;
   a heat insulator comprising:
      a first portion facing the upper portion having a length approximately equal to or longer than the cell stack length;
      a second portion separated from the first portion by an opening, facing the lower portion, having a length approximately equal to or longer than the cell stack length;

a housing for housing the cell stack and the heat insulator,
wherein the opening is located between the first portion and the second portion, and extends from the first end to the second end;
the side surface of the cell stack including:
- a first side surface; and
- a second side surface on opposite side of cell stack from the first side surface, and the heat insulator including:
- a first member facing the first side surface and comprising the first portion and the second portion; and
- a second member facing the second side surface and comprising the first portion and the second portion;

a reactant gas inlet including an outlet facing the first side surface of the cell stack,
wherein the first member is located between the reactant gas inlet and the first side surface of the cell stack and the outlet is located under the first member.

8. The fuel cell module according to claim 7, wherein the fuel cells are solid oxide fuel cells.

9. The fuel cell module according to claim 7, further comprising:
- a first opening located between the first portion and the second portion of the first member, and comprising an upper end and a lower end; and
- a second opening located between the first portion and the second portion of the second member, and comprising an upper end and a lower end, wherein the fuel cells comprise a lower end, and
wherein a first distance between the upper end of the first opening and the lower end of the fuel cells is approximately the same as a second distance between the upper end of the second opening and the lower end of the fuel cells.

10. The fuel cell module according to claim 7, further comprising an attaching member attaching the second member to the second side surface of the cell stack.

11. The fuel cell module according to claim 9, wherein a third distance between the lower end of the first opening and the lower end of the fuel cells is approximately the same as a fourth distance between the lower end of the second opening and the lower end of the fuel cells.

12. The fuel cell module according to claim 9, wherein the first opening has approximately the same shape as the second opening.

* * * * *